(12) United States Patent
Ke

(10) Patent No.: US 11,474,328 B2
(45) Date of Patent: Oct. 18, 2022

(54) SIX-PIECE OPTICAL LENS SYSTEM

(71) Applicant: NEWMAX TECHNOLOGY CO., LTD., Taichung (TW)

(72) Inventor: Sian-Chih Ke, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 351 days.

(21) Appl. No.: 16/820,737

(22) Filed: Mar. 17, 2020

(65) Prior Publication Data

US 2021/0294075 A1    Sep. 23, 2021

(51) Int. Cl.
*G02B 13/00* (2006.01)
*H04N 5/225* (2006.01)
*G02B 9/62* (2006.01)

(52) U.S. Cl.
CPC .......... *G02B 13/0045* (2013.01); *G02B 9/62* (2013.01); *H04N 5/2254* (2013.01)

(58) Field of Classification Search
CPC ........ G02B 9/62; G02B 9/64; G02B 13/0045; G02B 13/001; G02B 13/0015; G02B 13/002; G02B 13/02; G02B 15/143; G02B 27/0025; H04N 5/2254

USPC .......... 359/752, 713, 658, 757, 756
See application file for complete search history.

(56) References Cited

U.S. PATENT DOCUMENTS

2020/0409092 A1 * 12/2020 Sun .................. G02B 13/18

FOREIGN PATENT DOCUMENTS

WO    WO-2021031240 A1 *  2/2021  ......... G02B 13/0045

* cited by examiner

*Primary Examiner* — Travis S Fissel
(74) *Attorney, Agent, or Firm* — Bruce Stone LLP; Joseph A. Bruce

(57) ABSTRACT

A six-piece optical lens system includes, in order from the object side to the image side: a stop, a first lens element with a positive refractive power, a second lens element with a negative refractive power, a third lens element with a refractive power, a fourth lens element with a negative refractive power, a fifth lens element with a positive refractive power, and a sixth lens element with a negative refractive power. Such arrangements can provide a miniaturized six-piece optical lens system having a big stop and high image quality.

23 Claims, 12 Drawing Sheets

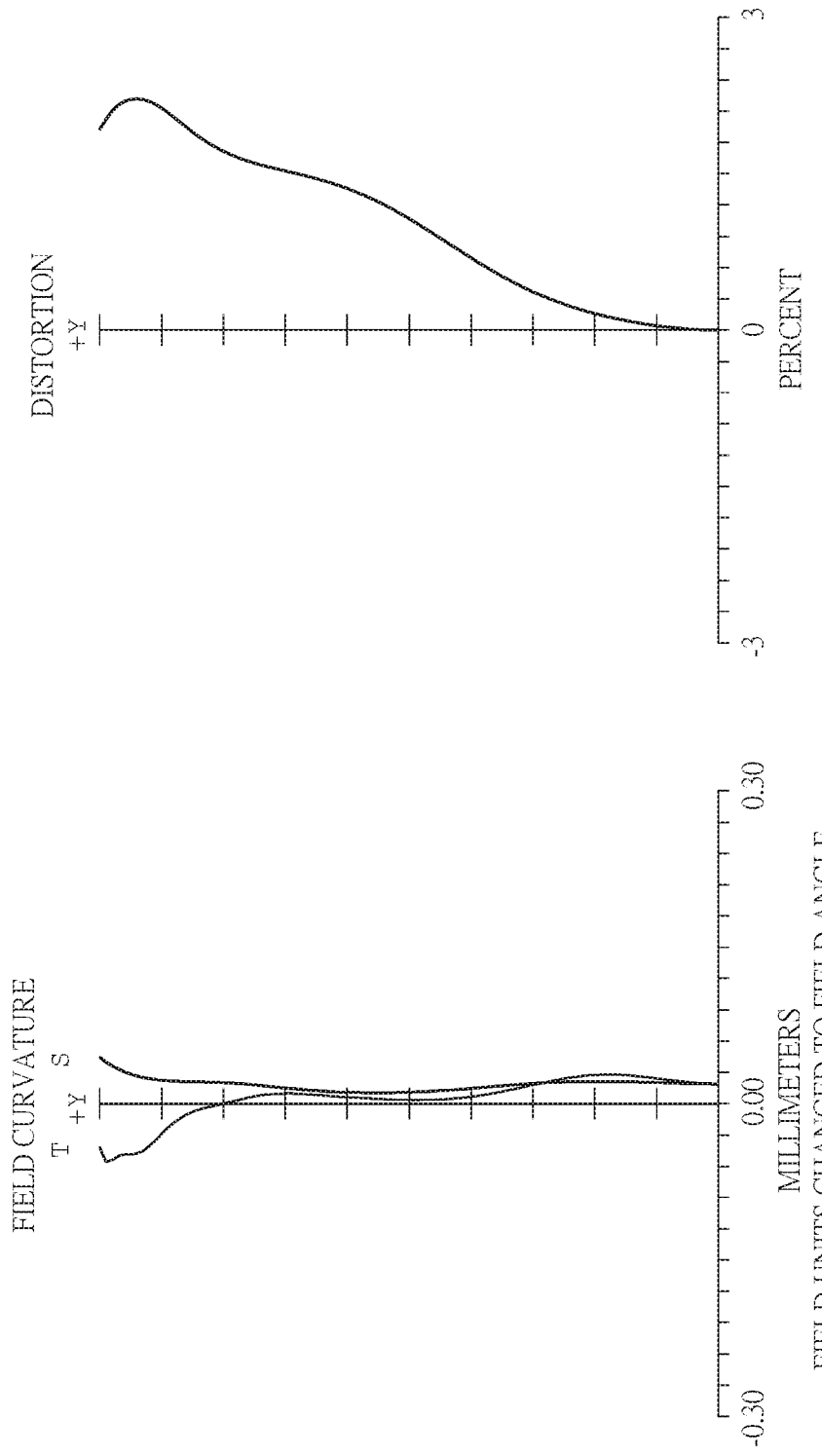

SIX-PIECE OPTICAL LENS SYSTEM

BACKGROUND

Field of the Invention

The present invention relates to a six-piece optical lens system, and more particularly to a miniaturized six-piece optical lens system applicable to electronic products.

Description of the Prior Art

In recent years, with the rapid development of portable electronic products, such as, smartphone, tablet computer and so on, small optical lens system applied to portable electronic products has been indispensable. In addition, as the advanced semiconductor manufacturing technologies have allowed the image sensors with smaller size and higher pixel, small optical lens systems have increasingly higher pixel, there's an increasing demand for an optical lens system with better image quality.

Conventional miniaturized optical lens systems used in portable electronic products mostly consist of five lens elements, however, since the high profile portable electronic products, such as smart phone, wearable device and tablet personal computer, are becoming prevalent, the demand for resolution and imaging quality of the miniaturized optical lens systems also increases. The conventional five-piece lens system cannot satisfy higher demand.

Currently, conventional six-piece optical lens systems is developed to provide imaging lens systems with big stop and high image quality, however, the total track length of these optical lens systems is too long, and it is difficult to have the characteristics of big stop, high image quality and miniaturization, which are not applicable to portable electronic products.

The present invention mitigates and/or obviates the aforementioned disadvantages.

SUMMARY

The primary objective of the present invention is to provide a miniaturized six-piece optical lens system having a big stop and high image quality.

Therefore, a six-piece optical lens system in accordance with the present invention comprises a stop and a lens group having six lens elements, in order from an object side to an image side: the stop; a first lens element with a positive refractive power having an object-side surface being convex near an optical axis and an image-side surface being concave near the optical axis, at least one of the object-side surface and the image-side surface of the first lens element being aspheric; a second lens element with a negative refractive power having an object-side surface being convex near the optical axis and an image-side surface being concave near the optical axis, at least one of the object-side surface and the image-side surface of the second lens element being aspheric; a third lens element with a refractive power, at least one of an object-side surface and an image-side surface of the third lens element being aspheric; a fourth lens element with a negative refractive power having an object-side surface being convex near the optical axis and an image-side surface being concave near the optical axis, at least one of the object-side surface and the image-side surface of the fourth lens element being aspheric and provided with at least one inflection point; a fifth lens element with a positive refractive power having an object-side surface being convex near the optical axis and an image-side surface being convex near the optical axis, at least one of the object-side surface and the image-side surface of the fifth lens element being aspheric and provided with at least one inflection point; and a sixth lens element with a negative refractive power having an object-side surface being concave near the optical axis and an image-side surface being concave near the optical axis, at least one of the object-side surface and the image-side surface of the sixth lens element being aspheric and provided with at least one inflection point.

Preferably, a focal length of the first lens element is f1, a focal length of the second lens element is f2, and they satisfy the relation: $-0.6<f1/f2<-0.3$, so that the refractive power of the first lens element and the second lens element are more suitable, it will be favorable to obtain a wide field of view and avoid the excessive increase of aberration of the system.

Preferably, the focal length of the second lens element is f2, a focal length of the third lens element is f3, and they satisfy the relation: $-0.03<f2/f3<0.43$, so that the refractive power of the third lens element can be distributed effectively and will not be too large, it will be favorable to reduce the sensitivity of the system and reduce the aberration.

Preferably, the focal length of the third lens element is f3, a focal length of the fourth lens element is f4, and they satisfy the relation: $-81<f3/f4<3.1$, so that the refractive power of the fourth lens element can be distributed effectively and will not be too large, it will be favorable to reduce the sensitivity of the system and reduce the aberration.

Preferably, the focal length of the fourth lens element is f4, a focal length of the fifth lens element is f5, and they satisfy the relation: $-13.6<f4/f5<-3.3$, so that the refractive power of the fifth lens element can be distributed effectively and will not be too large, it will be favorable to reduce the sensitivity of the system and reduce the aberration.

Preferably, the focal length of the fifth lens element is f5, a focal length of the sixth lens element is f6, and they satisfy the relation: $-1.7<f5/f6<-0.75$, so that the refractive power of the sixth lens element can be distributed effectively and will not be too large, it will be favorable to reduce the sensitivity of the system and reduce the aberration.

Preferably, the focal length of the first lens element is f1, a focal length of the second lens element and the third lens element combined is f23, and they satisfy the relation: $-0.70<f1/f23<-0.30$, which can balance the refractive power of the six-piece optical lens system, consequently achieving the optimum imaging effect. Preferably, the focal length of the second lens element and the third lens element combined is f23, the focal length of the fourth lens element is f4, and they satisfy the relation: $0.1<f23/f4<0.85$, which is favorable to increase the field of view and enlarge the stop of the six-piece optical lens system. Meanwhile, the assembling tolerance can be reduced to improve yield rate.

Preferably, the focal length of the second lens element and the third lens element combined is f23, a focal length of the fourth lens element and the fifth lens element combined is f45, and they satisfy the relation: $-3.0<f23/f45<-1.0$. If f23/f45 satisfies the above relation, a wide field of view, high pixel and low height can be provided and the resolution can be improved evidently. Contrarily, if f23/f45 exceeds the above range, the performance and resolution of the optical lens system will be reduced, and the yield rate will be low.

Preferably, the focal length of the fourth lens element and the fifth lens element combined is f45, the focal length of the sixth lens element is f6, and they satisfy the relation: $-1.9<f45/f6<-0.85$. If f45/f6 satisfies the above relation, a wide field of view, high pixel and low height can be provided and the resolution can be improved evidently. Contrarily, if f45/f6 exceeds the above range, the performance and resolution of the optical lens system will be reduced, and the yield rate will be low.

Preferably, a focal length of the first lens element and the second lens element combined is f12, a focal length of the third lens element and the fourth lens element combined is f34, and they satisfy the relation: $-0.65<f12/f34<-0.15$. If f12/f34 satisfies the above relation, a wide field of view, high pixel and low height can be provided and the resolution can be improved evidently. Contrarily, if f12/f34 exceeds the above range, the performance and resolution of the optical lens system will be reduced, and the yield rate will be low.

Preferably, the focal length of the third lens element and the fourth lens element combined is f34, a focal length of the fifth lens element and the sixth lens element combined is f56, and they satisfy the relation: $-1.25<f34/f56<-0.15$. If f34/f56 satisfies the above relation, a wide field of view, high pixel and low height can be provided and the resolution can be improved evidently. Contrarily, if f34/f56 exceeds the above range, the performance and resolution of the optical lens system will be reduced, and the yield rate will be low.

Preferably, a focal length of the first lens element, the second lens element and the third lens element combined is f123, the focal length of the fourth lens element and the fifth lens element combined is f45, and they satisfy the relation: $1.0<f123/f45<2.5$. Appropriate refractive power is favorable to reduce the spherical aberration and astigmatism of the optical lens system effectively.

Preferably, the focal length of the first lens element, the second lens element and the third lens element combined is f123, a focal length of the fourth lens element, the fifth lens element and the sixth lens element combined is f456, and they satisfy the relation: $-0.35<f123/f456<0.15$. If f123/f456 satisfies the above relation, a wide field of view, high pixel and low height can be provided and the resolution can be improved evidently. Contrarily, if f123/f456 exceeds the above range, the performance and resolution of the optical lens system will be reduced, and the yield rate will be low.

Preferably, the focal length of the first lens element is f1, a focal length of the second lens element, the third lens element and the fourth lens element combined is f234, and they satisfy the relation: $-1.05<f1/f234<-0.45$. Appropriate refractive power is favorable to reduce the spherical aberration and astigmatism of the optical lens system effectively.

Preferably, the focal length of the second lens element, the third lens element and the fourth lens element combined is f234, the focal length of the fifth lens element and the sixth lens element combined is f56, and they satisfy the relation: $-0.55<f234/f56<-0.15$. Appropriate refractive power is favorable to reduce the spherical aberration and astigmatism of the optical lens system effectively.

Preferably, a focal length of the first lens element and the second lens element combined is f12, a focal length of the third lens element, the fourth lens element and the fifth lens element combined is f345, and they satisfy the relation: $1.00<f12/f345<2.15$. If f12/f345 satisfies the above relation, a wide field of view, high pixel and low height can be provided and the resolution can be improved evidently. Contrarily, if f12/f345 exceeds the above range, the performance and resolution of the optical lens system will be reduced, and the yield rate will be low.

Preferably, the focal length of the third lens element, the fourth lens element and the fifth lens element combined is f345, the focal length of the sixth lens element is f6, and they satisfy the relation: $-1.95<f345/f6<-0.9$. If f345/f6 satisfies the above relation, a wide field of view, high pixel and low height can be provided and the resolution can be improved evidently. Contrarily, if f345/f6 exceeds the above range, the performance and resolution of the optical lens system will be reduced, and the yield rate will be low.

Preferably, a radius of curvature of the object-side surface of the third lens element is R5, a radius of curvature of the image-side surface of the third lens element is R6, and they satisfy the relation: $-2.0<R5/R6<4.8$, so that the curvature configuration of the surfaces of the third lens element can be balanced effectively, so as to balance the field of view with the total track length.

Preferably, a central thickness of the second lens element along the optical axis is CT2, a central thickness of the first lens element along the optical axis is CT1, and they satisfy the relation: $0.15<CT2/CT1<0.45$, which can reduce the spherical aberration and astigmatism of the six-piece optical lens system.

Preferably, a central thickness of the third lens element along the optical axis is CT3, the central thickness of the second lens element along the optical axis is CT2, and they satisfy the relation: $0.60<CT3/CT2<1.35$, which can reduce the spherical aberration and astigmatism of the six-piece optical lens system.

Preferably, a focal length of the six-piece optical lens system is f, a distance from the object-side surface of the first lens element to an image plane along the optical axis is TL, and they satisfy the relation: $0.6<f/TL<1.2$, it will be favorable to obtain a wide field of view and maintain the objective of miniaturization of the six-piece optical lens system, which can be used in thin electronic products.

Preferably, an Abbe number of the first lens element is V1, an Abbe number of the second lens element is V2, and they satisfy the relation: $30<V1-V2<42$, so that the chromatic aberration of the six-piece optical lens system can be modified effectively.

Preferably, an Abbe number of the third lens element is V3, an Abbe number of the fourth lens element is V4, and they satisfy the relation: $30<V4-V3<42$, so that the chromatic aberration of the six-piece optical lens system can be modified effectively.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 4B shows the image plane curve and the distortion curve of the fourth embodiment of the present invention.

DETAILED DESCRIPTION

Figure 1A:
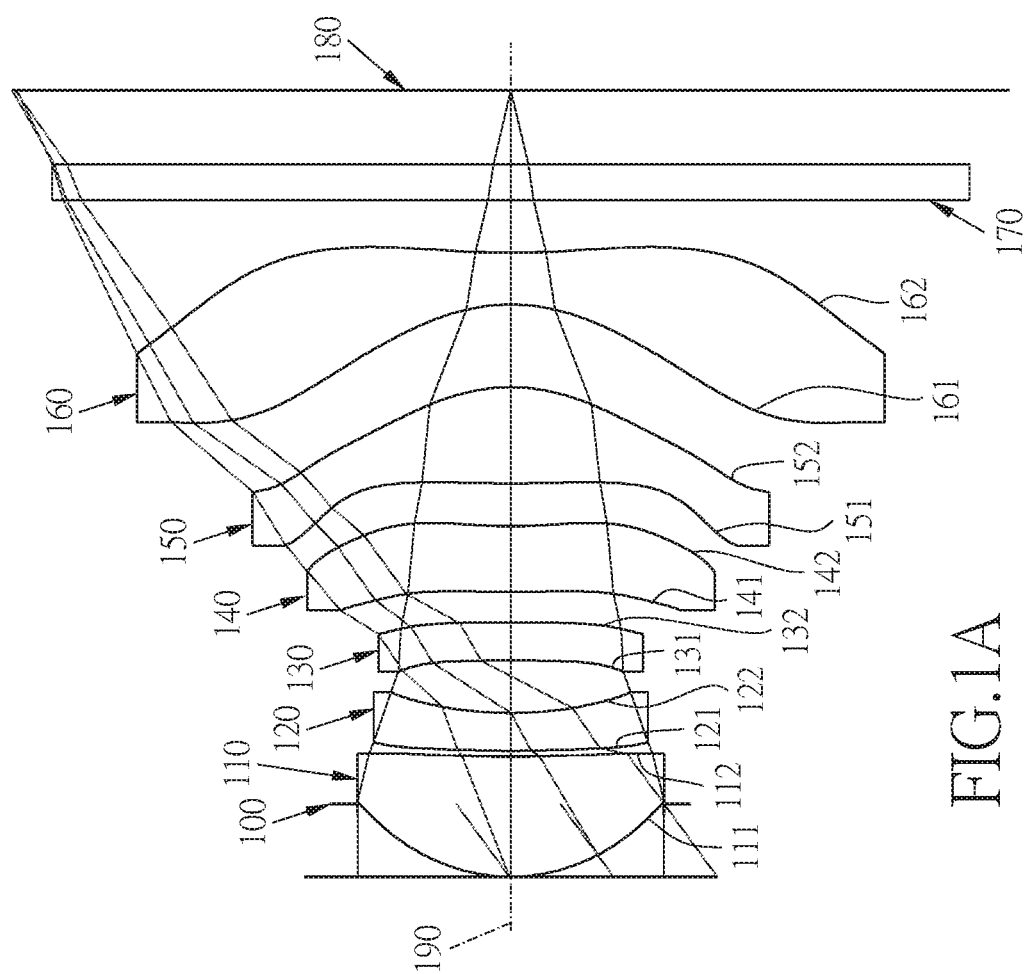
FIG. 1A shows a six-piece optical lens system in accordance with a first embodiment of the present invention.
Figure 1B:
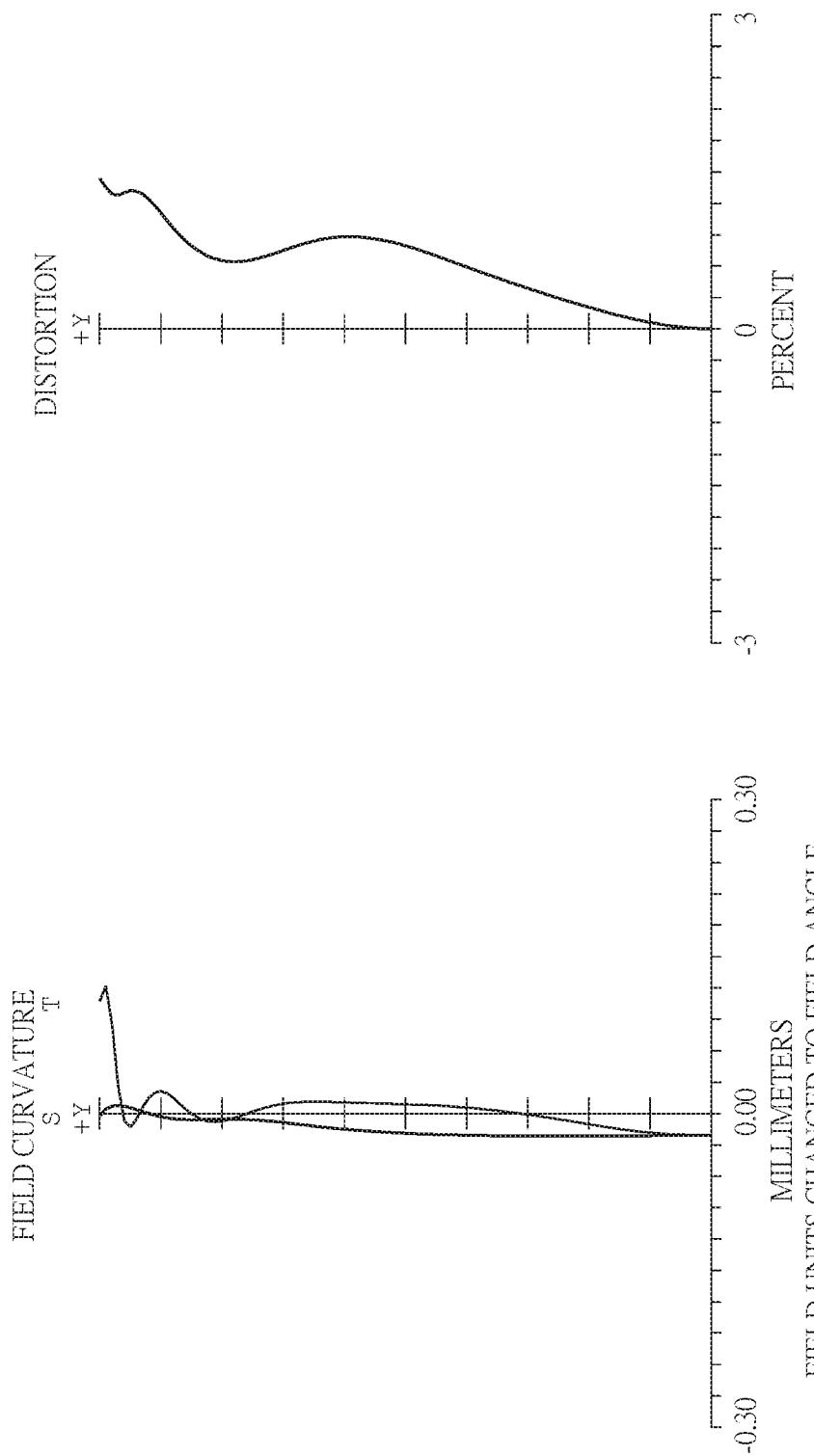
FIG. 1B shows the image plane curve and the distortion curve of the first embodiment of the present invention.

Referring to FIGS. 1A and 1B, FIG. 1A shows a six-piece optical lens system in accordance with a first embodiment of the present invention, and FIG. 1B shows, in order from left to right, the image plane curve and the distortion curve of the first embodiment of the present invention. A six-piece optical lens system in accordance with the first embodiment of the present invention comprises a stop 100 and a lens group. The lens group comprises, in order from an object side to an image side: a first lens element 110, a second lens element 120, a third lens element 130, a fourth lens element 140, a fifth lens element 150, a sixth lens element 160, an IR cut filter 170, and an image plane 180, wherein the six-piece optical lens system has a total of six lens elements with refractive power. The stop 100 is disposed between an image-side surface 112 of the first lens element 110 and an object to be imaged.

The first lens element 110 with a positive refractive power has an object-side surface 111 being convex near an optical axis 190 and the image-side surface 112 being concave near the optical axis 190, the object-side surface 111 and the image-side surface 112 are aspheric, and the first lens element 110 is made of plastic material.

The second lens element 120 with a negative refractive power has an object-side surface 121 being convex near the optical axis 190 and the image-side surface 122 being concave near the optical axis 190, the object-side surface 121 and the image-side surface 122 are aspheric, and the second lens element 120 is made of plastic material.

The third lens element 130 with a negative refractive power has an object-side surface 131 being concave near the optical axis 190 and an image-side surface 132 being concave near the optical axis 190, the object-side surface 131 and the image-side surface 132 are aspheric, and the third lens element 130 is made of plastic material.

The fourth lens element 140 with a negative refractive power has an object-side surface 141 being convex near the optical axis 190 and an image-side surface 142 being concave near the optical axis 190, the object-side surface 141 and the image-side surface 142 are aspheric and are provided with at least one inflection point, and the fourth lens element 140 is made of plastic material.

The fifth lens element 150 with a positive refractive power has an object-side surface 151 being convex near the optical axis 190 and an image-side surface 152 being convex near the optical axis 190, the object-side surface 151 and the image-side surface 152 are aspheric, the fifth lens element 150 is made of plastic material, and the object-side surface 151 is provided with at least one inflection point.

The sixth lens element 160 with a negative refractive power has an object-side surface 161 being concave near the optical axis 190 and an image-side surface 162 being concave near the optical axis 190, the object-side surface 161 and the image-side surface 162 are aspheric, the sixth lens element 160 is made of plastic material, and the image-side surface 162 is provided with at least one inflection point.

The IR cut filter 170 made of glass is located between the sixth lens element 160 and the image plane 180 and has no influence on the focal length of the six-piece optical lens system.

The equation for the aspheric surface profiles of the respective lens elements of the first embodiment is expressed as follows:

$$z = \frac{ch^2}{1 + [1 - (k+1)c^2h^2]^{0.5}} + Ah^4 + Bh^6 + Ch^8 + Dh^{10} + Eh^{12} + Fh^{14} + Gh^{16}$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, G, . . . : represent the high-order aspheric coefficients.

In the first embodiment of the present six-piece optical lens system, a focal length of the six-piece optical lens system is f, a f-number of the six-piece optical lens system is Fno, the six-piece optical lens system has a maximum view angle (field of view) FOV, and they satisfy the relations: f=3.89 mm; Fno=1.86; and FOV=81 degrees.

In the first embodiment of the present six-piece optical lens system, a focal length of the first lens element 110 is f1, a focal length of the second lens element 120 is f2, and they satisfy the relation: f1/f2=−0.42.

In the first embodiment of the present six-piece optical lens system, the focal length of the second lens element 120 is f2, a focal length of the third lens element 130 is f3, and they satisfy the relation: f2/f3=0.21.

In the first embodiment of the present six-piece optical lens system, the focal length of the third lens element 130 is f3, a focal length of the fourth lens element 140 is f4, and they satisfy the relation: f3/f4=2.35.

In the first embodiment of the present six-piece optical lens system, the focal length of the fourth lens element 140 is f4, a focal length of the fifth lens element 150 is f5, and they satisfy the relation: f4/f5=−6.53.

In the first embodiment of the present six-piece optical lens system, the focal length of the fifth lens element 150 is f5, a focal length of the sixth lens element 160 is f6, and they satisfy the relation: f5/f6=−1.06.

In the first embodiment of the present six-piece optical lens system, the focal length of the first lens element 110 is f1, a focal length of the second lens element 120 and the third lens element 130 combined is f23, and they satisfy the relation: f1/f23=−0.51.

In the first embodiment of the present six-piece optical lens system, the focal length of the second lens element 120 and the third lens element 130 combined is f23, the focal length of the fourth lens element 140 is f4, and they satisfy the relation: f23/f4=0.41.

In the first embodiment of the present six-piece optical lens system, the focal length of the second lens element 120 and the third lens element 130 combined is f23, a focal length of the fourth lens element 140 and the fifth lens element 150 combined is f45, and they satisfy the relation: f23/f45=−2.31.

In the first embodiment of the present six-piece optical lens system, the focal length of the fourth lens element 140 and the fifth lens element 150 combined is f45, the focal length of the sixth lens element 160 is f6, and they satisfy the relation: f45/f6=−1.23.

In the first embodiment of the present six-piece optical lens system, a focal length of the first lens element 110 and the second lens element 120 combined is f12, a focal length of the third lens element 130 and the fourth lens element 140 combined is f34, and they satisfy the relation: f12/f34=−0.44.

In the first embodiment of the present six-piece optical lens system, the focal length of the third lens element 130 and the fourth lens element 140 combined is f34, a focal length of the fifth lens element 150 and the sixth lens element 160 combined is f56, and they satisfy the relation: f34/f56=−0.93.

In the first embodiment of the present six-piece optical lens system, a focal length of the first lens element 110, the second lens element 120 and the third lens element 130 combined is f123, the focal length of the fourth lens element 140 and the fifth lens element 150 combined is f45, and they satisfy the relation: f123/f45=1.64.

In the first embodiment of the present six-piece optical lens system, the focal length of the first lens element 110, the second lens element 120 and the third lens element 130 combined is f123, a focal length of the fourth lens element 140, the fifth lens element 150 and the sixth lens element 160 combined is f456, and they satisfy the relation: f123/f456=0.03.

In the first embodiment of the present six-piece optical lens system, the focal length of the first lens element 110 is f1, a focal length of the second lens element 120, the third lens element 130 and the fourth lens element 140 combined is f234, and they satisfy the relation: f1/f234=−0.76.

In the first embodiment of the present six-piece optical lens system, the focal length of the second lens element 120, the third lens element 130 and the fourth lens element 140 combined is f234, the focal length of the fifth lens element 150 and the sixth lens element 160 combined is f56, and they satisfy the relation: f234/f56=−0.37.

In the first embodiment of the present six-piece optical lens system, the focal length of the first lens element 110 and the second lens element 120 combined is f12, a focal length of the third lens element 130, the fourth lens element 140 and the fifth lens element 150 combined is f345, and they satisfy the relation: f12/f345=1.64.

In the first embodiment of the present six-piece optical lens system, the focal length of the third lens element 130, the fourth lens element 140 and the fifth lens element 150 combined is f345, the focal length of the sixth lens element 160 is f6, and they satisfy the relation: f345/f6=−1.29.

In the first embodiment of the present six-piece optical lens system, a radius of curvature of the object-side surface 131 of the third lens element 130 is R5, a radius of curvature of the image-side surface 132 of the third lens element 130 is R6, and they satisfy the relation: R5/R6=−1.53.

In the first embodiment of the present six-piece optical lens system, a central thickness of the second lens element 120 along the optical axis 190 is CT2, a central thickness of the first lens element 110 along the optical axis 190 is CT1, and they satisfy the relation: CT2/CT1=0.31.

In the first embodiment of the present six-piece optical lens system, a central thickness of the third lens element 130 along the optical axis 190 is CT3, the central thickness of the second lens element 120 along the optical axis 190 is CT2, and they satisfy the relation: CT3/CT2=1.00.

In the first embodiment of the present six-piece optical lens system, the focal length of the six-piece optical lens system is f, a distance from the object-side surface 111 of the first lens element 110 to the image plane 180 along the optical axis 190 is TL, and they satisfy the relation: f/TL=0.85.

In the first embodiment of the present six-piece optical lens system, an Abbe number of the first lens element 110 is V1, an Abbe number of the second lens element 120 is V2, and they satisfy the relation: V1-V2=35.63.

In the first embodiment of the present six-piece optical lens system, an Abbe number of the third lens element 130 is V3, an Abbe number of the fourth lens element 140 is V4, and they satisfy the relation: V4-V3=35.63.

The detailed optical data of the first embodiment is shown in table 1, and the aspheric surface data is shown in table 2.

TABLE 1

Embodiment 1
f(focal length) = 3.89 mm, Fno = 1.86, FOV = 81 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.423 | | | | |
| 2 | Lens 1 | 1.452 | (ASP) | 0.700 | plastic | 1.54 | 56 | 3.08 |
| 3 | | 8.755 | (ASP) | 0.034 | | | | |
| 4 | Lens 2 | 8.602 | (ASP) | 0.220 | plastic | 1.66 | 20.37 | −7.39 |
| 5 | | 3.099 | (ASP) | 0.305 | | | | |
| 6 | Lens 3 | −58.484 | (ASP) | 0.220 | plastic | 1.66 | 20.37 | −34.59 |
| 7 | | 38.124 | (ASP) | 0.180 | | | | |
| 8 | Lens 4 | 6.447 | (ASP) | 0.383 | plastic | 1.54 | 56 | −14.74 |
| 9 | | 3.504 | (ASP) | 0.249 | | | | |
| 10 | Lens 5 | 8.105 | (ASP) | 0.561 | plastic | 1.54 | 56 | 2.26 |
| 11 | | −1.417 | (ASP) | 0.482 | | | | |
| 12 | Lens 6 | −1.464 | (ASP) | 0.301 | plastic | 1.54 | 56 | −2.12 |
| 13 | | 5.950 | (ASP) | 0.308 | | | | |
| 14 | IR-filter | infinity | | 0.210 | glass | 1.52 | 64.2 | |
| 15 | | infinity | | 0.428 | | | | |
| 16 | Image plane | infinity | | 0.000 | | | | |

TABLE 2

Aspheric Coefficients

| surface | 2 | 3 | 4 | 5 | 6 | 7 |
|---|---|---|---|---|---|---|
| K: | −7.6748E−01 | 5.5237E+01 | 7.2599E+01 | −2.2600E+01 | 6.0784E+01 | 8.9387E+01 |
| A: | 3.1229E−02 | −1.5139E−01 | −1.8594E−01 | 5.9963E−02 | −1.7569E−01 | −2.0589E−01 |
| B: | 7.8749E−03 | 2.3028E−01 | 5.6162E−01 | 1.8856E−01 | 5.7608E−01 | 5.2060E−01 |
| C: | 4.8847E−02 | 8.4627E−02 | −1.2003E+00 | −7.1009E−01 | −3.2005E+00 | −1.6852E+00 |
| D: | −1.2789E−01 | −9.7168E−01 | 2.0632E+00 | 1.5350E+00 | 8.7630E+00 | 3.1348E+00 |
| E: | 1.5044E−01 | 1.4931E+00 | −2.6460E+00 | −2.0114E+00 | −1.4077E+01 | −3.4951E+00 |
| F: | −7.4280E−02 | −9.9187E−01 | 2.0613E+00 | 1.4146E+00 | 1.1905E+01 | 2.1760E+00 |
| G: | 5.7099E−03 | 2.4575E−01 | −6.8358E−01 | −3.6770E−01 | −4.0138E+00 | −5.2271E−01 |

| surface | 8 | 9 | 10 | 11 | 12 | 13 |
|---|---|---|---|---|---|---|
| K: | −3.1525E+01 | −9.9000E+01 | 2.0527E+01 | −4.3353E+00 | −6.7832E−01 | −9.2373E+01 |
| A: | −3.3717E−01 | −1.2782E−01 | −1.7067E−01 | −8.0048E−02 | 6.8757E−02 | −2.3973E−02 |
| B: | 5.5090E−01 | −9.0521E−02 | 1.8120E−01 | 5.2174E−01 | −1.0224E−02 | −4.0206E−03 |
| C: | −7.8658E−01 | 3.5890E−01 | −1.8128E−01 | 8.5279E−02 | 5.5653E−04 | 3.7648E−03 |
| D: | 6.1623E−01 | −6.2035E−01 | 1.0611E−01 | −1.1950E−01 | 2.2163E−03 | −1.6240E−03 |
| E: | −1.0266E−01 | 5.4720E−01 | −6.1093E−02 | 5.5439E−02 | −8.2593E−04 | 3.5440E−04 |
| F: | −1.1842E−01 | −2.2801E−01 | 2.5067E−02 | −1.1123E−02 | 1.1479E−04 | −3.5993E−05 |
| G: | 4.5574E−02 | 3.5562E−02 | −3.9484E−03 | 8.1699E−04 | −5.6021E−06 | 1.3677E−06 |

The units of the radius of curvature, the thickness and the focal length in table 1 are expressed in mm, the surface numbers 0-16 represent the surfaces sequentially arranged from the object-side to the image-side along the optical axis. In table 2, k represents the conic coefficient of the equation of the aspheric surface profiles, and A, B, C, D, E, F, G . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
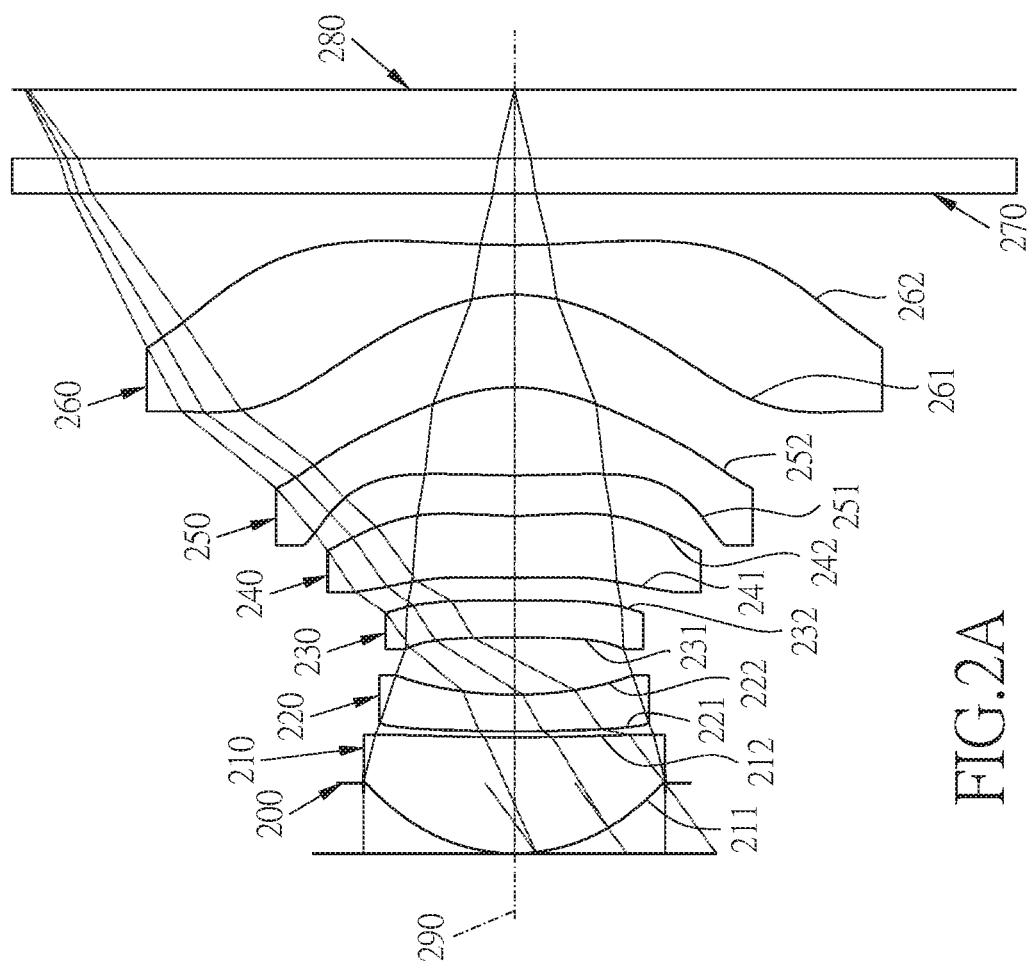
FIG. 2A shows a six-piece optical lens system in accordance with a second embodiment of the present invention.
Figure 2B:
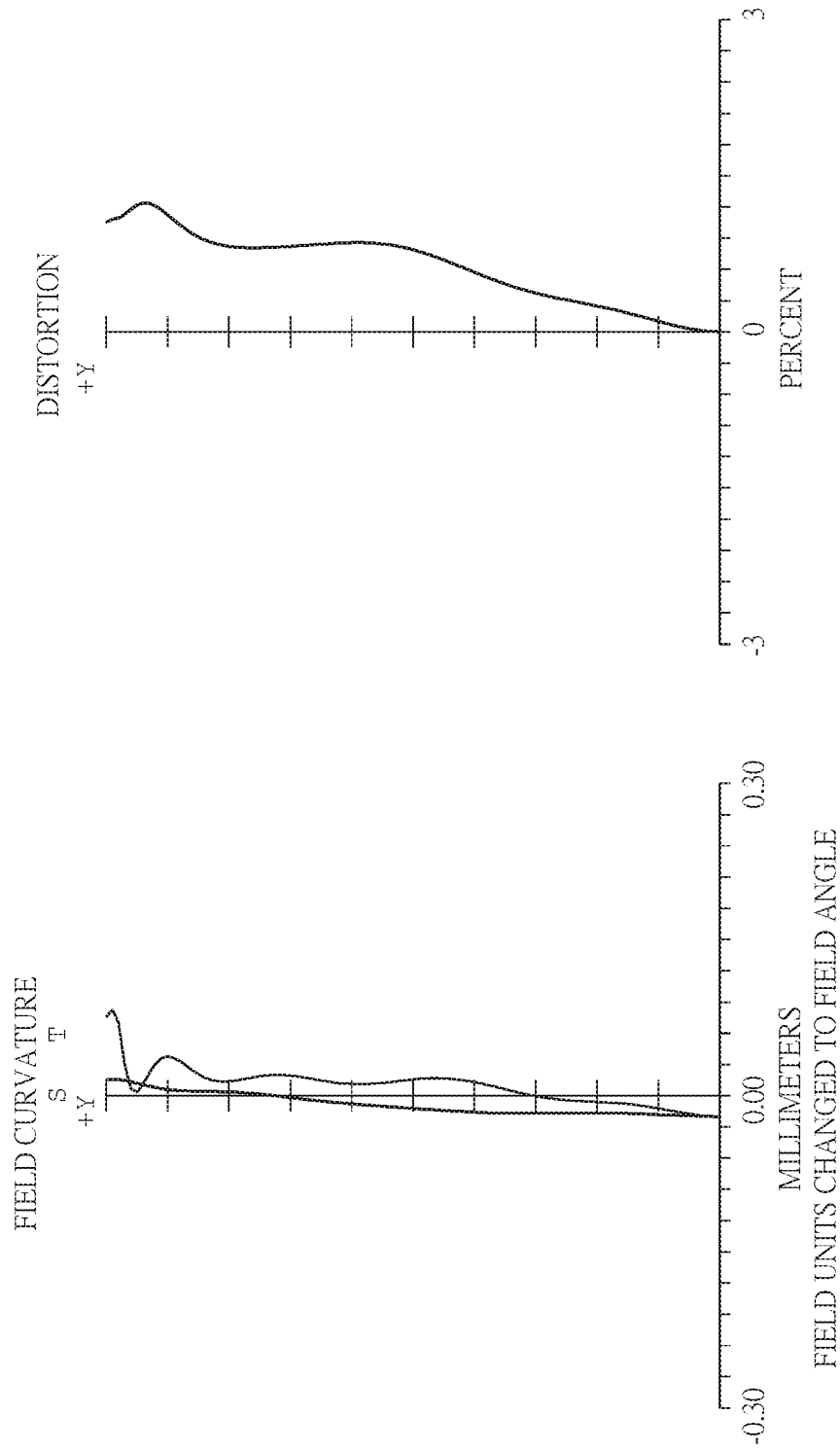
FIG. 2B shows the image plane curve and the distortion curve of the second embodiment of the present invention.

Referring to FIGS. 2A and 2B, FIG. 2A shows a six-piece optical lens system in accordance with a second embodiment of the present invention, and FIG. 2B shows, in order from left to right, the image plane curve and the distortion curve of the second embodiment of the present invention. A six-piece optical lens system in accordance with the second embodiment of the present invention comprises a stop 200 and a lens group. The lens group comprises, in order from an object side to an image side: a first lens element 210, a second lens element 220, a third lens element 230, a fourth lens element 240, a fifth lens element 250, a sixth lens element 260, an IR cut filter 270, and an image plane 280, wherein the six-piece optical lens system has a total of six lens elements with refractive power. The stop 200 is disposed between an image-side surface 212 of the first lens element 210 and an object to be imaged.

The first lens element 210 with a positive refractive power has an object-side surface 211 being convex near an optical axis 290 and the image-side surface 212 being concave near the optical axis 290, the object-side surface 211 and the image-side surface 212 are aspheric, and the first lens element 210 is made of plastic material.

The second lens element 220 with a negative refractive power has an object-side surface 221 being convex near the optical axis 290 and the image-side surface 222 being concave near the optical axis 290, the object-side surface 221 and the image-side surface 222 are aspheric, and the second lens element 220 is made of plastic material.

The third lens element 230 with a negative refractive power has an object-side surface 231 being concave near the optical axis 290 and an image-side surface 232 being concave near the optical axis 290, the object-side surface 231 and the image-side surface 232 are aspheric, and the third lens element 230 is made of plastic material.

The fourth lens element 240 with a negative refractive power has an object-side surface 241 being convex near the optical axis 290 and an image-side surface 242 being concave near the optical axis 290, the object-side surface 241 and the image-side surface 242 are aspheric and are provided with at least one inflection point, and the fourth lens element 240 is made of plastic material.

The fifth lens element 250 with a positive refractive power has an object-side surface 251 being convex near the optical axis 290 and an image-side surface 252 being convex near the optical axis 290, the object-side surface 251 and the image-side surface 252 are aspheric, the fifth lens element 250 is made of plastic material, and the object-side surface 251 is provided with at least one inflection point.

The sixth lens element 260 with a negative refractive power has an object-side surface 261 being concave near the optical axis 290 and an image-side surface 262 being concave near the optical axis 290, the object-side surface 261 and the image-side surface 262 are aspheric, the sixth lens element 260 is made of plastic material, and the image-side surface 262 is provided with at least one inflection point.

The IR cut filter 270 made of glass is located between the sixth lens element 260 and the image plane 280 and has no influence on the focal length of the six-piece optical lens system.

The detailed optical data of the second embodiment is shown in table 3, and the aspheric surface data is shown in table 4.

TABLE 3

Embodiment 2
f(focal length) = 3.90 mm, Fno = 1.86, FOV = 80.94 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.420 | | | | |
| 2 | Lens 1 | 1.467 | (ASP) | 0.695 | plastic | 1.54 | 56 | 3.09 |
| 3 | | 9.431 | (ASP) | 0.037 | | | | |
| 4 | Lens 2 | 9.009 | (ASP) | 0.220 | plastic | 1.66 | 20.37 | −7.55 |
| 5 | | 3.199 | (ASP) | 0.343 | | | | |
| 6 | Lens 3 | −37.355 | (ASP) | 0.221 | plastic | 1.66 | 20.37 | −22.93 |
| 7 | | 25.950 | (ASP) | 0.138 | | | | |
| 8 | Lens 4 | 6.983 | (ASP) | 0.371 | plastic | 1.54 | 56 | −14.99 |
| 9 | | 3.697 | (ASP) | 0.243 | | | | |
| 10 | Lens 5 | 7.729 | (ASP) | 0.528 | plastic | 1.54 | 56 | 2.33 |
| 11 | | −1.482 | (ASP) | 0.556 | | | | |
| 12 | Lens 6 | −1.460 | (ASP) | 0.298 | plastic | 1.54 | 56 | −2.22 |
| 13 | | 7.580 | (ASP) | 0.308 | | | | |
| 14 | IR-filter | infinity | | 0.210 | glass | 1.52 | 64.2 | |
| 15 | | infinity | | 0.413 | | | | |
| 16 | Image plane | infinity | | 0.000 | | | | |

TABLE 4

Aspheric Coefficients

| surface | 2 | 3 | 4 | 5 | 6 | 7 |
|---|---|---|---|---|---|---|
| K: | −7.7801E−01 | 5.5237E+01 | 7.6781E+01 | −2.5405E+01 | 6.0784E+01 | 8.9387E+01 |
| A: | 2.7461E−02 | −1.5041E−01 | −1.8769E−01 | 4.9951E−02 | −1.9346E−01 | −3.0134E−01 |
| B: | 4.0041E−02 | 3.2778E−01 | 6.0178E−01 | 2.0639E−01 | 5.7273E−01 | 8.8154E−01 |
| C: | −9.2218E−02 | −4.1514E−01 | −1.3779E+00 | −7.4344E−01 | −2.8298E+00 | −2.5067E+00 |
| D: | 1.8543E−01 | 3.0034E−01 | 2.4802E+00 | 1.6095E+00 | 6.9910E+00 | 4.3373E+00 |
| E: | −2.2203E−01 | −2.2813E−01 | −3.1520E+00 | −2.1271E+00 | −1.0360E+01 | −4.6102E+00 |
| F: | 1.5065E−01 | 1.9436E−01 | 2.3405E+00 | 1.5138E+00 | 8.1242E+00 | 2.7521E+00 |
| G: | −4.7837E−02 | −8.0143E−02 | −7.2989E−01 | −4.0677E−01 | −2.5095E+00 | −6.5865E−01 |

| surface | 8 | 9 | 10 | 11 | 12 | 13 |
|---|---|---|---|---|---|---|
| K: | −3.1525E+01 | −9.6809E+01 | −2.4236E+01 | −8.1771E+00 | −6.8126E−01 | −9.2373E+01 |
| A: | −4.9625E−01 | −2.4195E−01 | −1.3990E−01 | −1.7455E−01 | 9.9805E−02 | −2.2676E−02 |
| B: | 1.0511E+00 | 1.3613E−01 | 1.0477E−01 | 2.5268E−01 | −6.5556E−02 | −7.7280E−03 |
| C: | −1.7493E+00 | 6.7663E−03 | −5.1634E−02 | −1.7107E−01 | 3.6500E−02 | 4.7919E−03 |
| D: | 1.9817E+00 | −2.3093E−01 | −7.1285E−02 | 4.8264E−02 | −9.6552E−03 | −1.3134E−03 |
| E: | −1.3227E+00 | 3.0802E−01 | 8.6309E−02 | −1.3772E−03 | 1.3216E−03 | 1.6836E−04 |
| F: | 4.6788E−01 | −1.5843E−01 | −3.6846E−02 | −1.6594E−03 | −8.8157E−05 | −6.1768E−06 |
| G: | −6.7675E−02 | 2.8744E−02 | 6.0111E−03 | 2.0354E−04 | 2.2302E−06 | −2.2399E−07 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 3.90 | f12/f34 | −0.50 |
| Fno | 1.86 | f34/f56 | −0.92 |
| FOV[deg.] | 80.94 | f123/f45 | 1.90 |
| f1/f2 | −0.41 | f123/f456 | 0.10 |
| f2/f3 | 0.33 | f1/f234 | −0.79 |
| f3/f4 | 1.53 | f234/f56 | −0.40 |
| f4/f5 | −6.44 | f12/f345 | 1.53 |
| f5/f6 | −1.05 | f345/f6 | −1.31 |

-continued

| Embodiment 2 | | | |
|---|---|---|---|
| f1/f23 | −0.55 | R5/R6 | −1.44 |
| f23/f4 | 0.37 | CT2/CT1 | 0.32 |
| f23/f45 | −2.08 | CT3/CT2 | 1.00 |
| f45/f6 | −1.22 | f/TL | 0.85 |
| V1 − V2 | 35.63 | V4 − V3 | 35.63 |

Figure 3A:
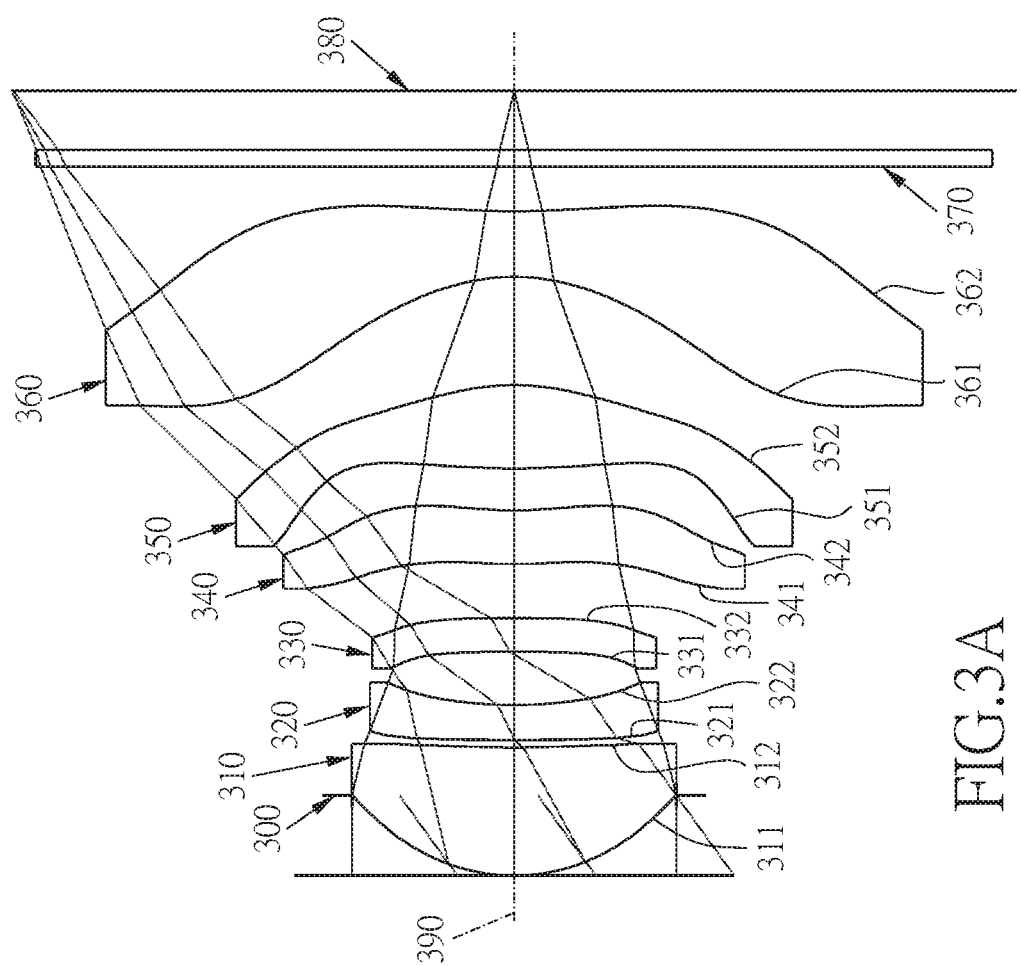
FIG. 3A shows a six-piece optical lens system in accordance with a third embodiment of the present invention.
Figure 3B:
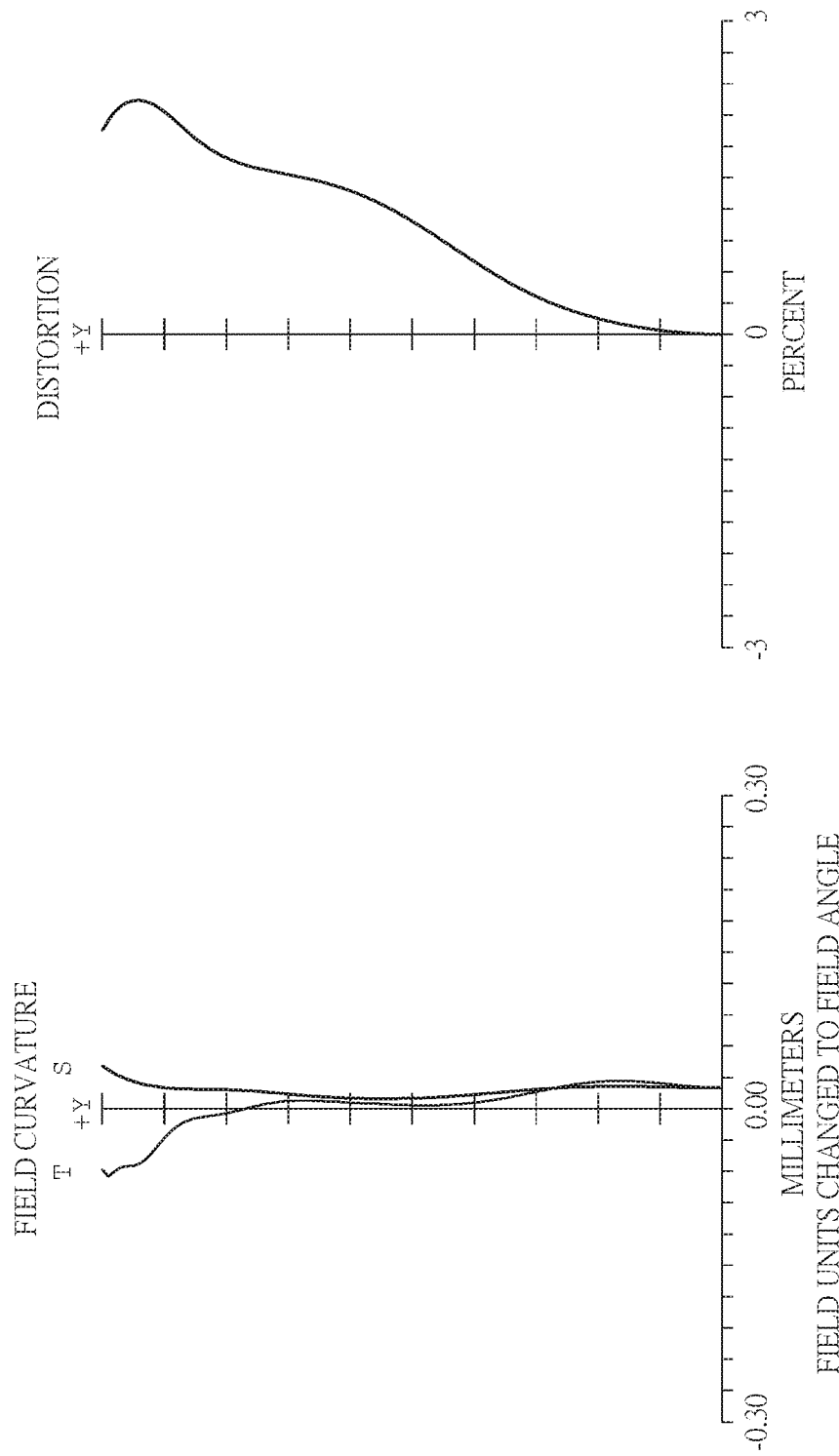
FIG. 3B shows the image plane curve and the distortion curve of the third embodiment of the present invention.

Referring to FIGS. 3A and 3B, FIG. 3A shows a six-piece optical lens system in accordance with a third embodiment of the present invention, and FIG. 3B shows, in order from left to right, the image plane curve and the distortion curve of the third embodiment of the present invention. A six-piece optical lens system in accordance with the third embodiment of the present invention comprises a stop 300 and a lens group. The lens group comprises, in order from an object side to an image side: a first lens element 310, a second lens element 320, a third lens element 330, a fourth lens element 340, a fifth lens element 350, a sixth lens element 360, an IR cut filter 370, and an image plane 380, wherein the six-piece optical lens system has a total of six lens elements with refractive power. The stop 300 is disposed between an image-side surface 312 of the first lens element 310 and an object to be imaged.

The first lens element 310 with a positive refractive power has an object-side surface 311 being convex near an optical axis 390 and the image-side surface 312 being concave near the optical axis 390, the object-side surface 311 and the image-side surface 312 are aspheric, and the first lens element 310 is made of plastic material.

The second lens element 320 with a negative refractive power has an object-side surface 321 being convex near the optical axis 390 and the image-side surface 322 being concave near the optical axis 390, the object-side surface 321 and the image-side surface 322 are aspheric, and the second lens element 320 is made of plastic material.

The third lens element 330 with a positive refractive power has an object-side surface 331 being convex near the optical axis 390 and an image-side surface 332 being concave near the optical axis 390, the object-side surface 331 and the image-side surface 332 are aspheric, and the third lens element 330 is made of plastic material.

The fourth lens element 340 with a negative refractive power has an object-side surface 341 being convex near the optical axis 390 and an image-side surface 342 being concave near the optical axis 390, the object-side surface 341 and the image-side surface 342 are aspheric and are provided with at least one inflection point, and the fourth lens element 340 is made of plastic material.

The fifth lens element 350 with a positive refractive power has an object-side surface 351 being convex near the optical axis 390 and an image-side surface 352 being convex near the optical axis 390, the object-side surface 351 and the image-side surface 352 are aspheric, the fifth lens element 350 is made of plastic material, and the object-side surface 351 is provided with at least one inflection point.

The sixth lens element 360 with a negative refractive power has an object-side surface 361 being concave near the optical axis 390 and an image-side surface 362 being concave near the optical axis 390, the object-side surface 361 and the image-side surface 362 are aspheric, the sixth lens element 360 is made of plastic material, and the image-side surface 362 is provided with at least one inflection point.

The IR cut filter 370 made of glass is located between the sixth lens element 360 and the image plane 380 and has no influence on the focal length of the six-piece optical lens system.

The detailed optical data of the third embodiment is shown in table 5, and the aspheric surface data is shown in table 6.

TABLE 5

Embodiment 3
f(focal length) = 4.76 mm, Fno = 1.84, FOV = 82.22 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.549 | | | | |
| 2 | Lens 1 | 1.753 | (ASP) | 0.878 | plastic | 1.54 | 56 | 3.84 |
| 3 | | 8.815 | (ASP) | 0.050 | | | | |
| 4 | Lens 2 | 11.920 | (ASP) | 0.241 | plastic | 1.67 | 19.24 | −8.82 |
| 5 | | 3.948 | (ASP) | 0.363 | | | | |
| 6 | Lens 3 | 626.713 | (ASP) | 0.231 | plastic | 1.67 | 19.24 | 946.56 |
| 7 | | 27478.857 | (ASP) | 0.374 | | | | |
| 8 | Lens 4 | 5.953 | (ASP) | 0.366 | plastic | 1.54 | 56 | −15.11 |
| 9 | | 3.384 | (ASP) | 0.288 | | | | |
| 10 | Lens 5 | 7.880 | (ASP) | 0.570 | plastic | 1.54 | 56 | 3.20 |
| 11 | | −2.189 | (ASP) | 0.743 | | | | |
| 12 | Lens 6 | −1.864 | (ASP) | 0.450 | plastic | 1.54 | 56 | −2.74 |
| 13 | | 8.226 | (ASP) | 0.308 | | | | |
| 14 | IR-filter | infinity | | 0.110 | glass | 1.52 | 64.2 | |
| 15 | | infinity | | 0.410 | | | | |
| 16 | Image plane | infinity | | 0.000 | | | | |

TABLE 6

Aspheric Coefficients

| surface | 2 | 3 | 4 | 5 | 6 | 7 |
|---|---|---|---|---|---|---|
| K: | −7.5327E−01 | 4.7594E+01 | 9.7590E+01 | −2.0645E+01 | 5.8150E+01 | 8.6079E+01 |
| A: | 1.9904E−02 | −1.3458E−01 | −1.4900E−01 | −1.4717E−02 | −1.3088E−01 | −1.4259E−01 |
| B: | −7.5475E−03 | 2.7358E−01 | 3.9168E−01 | 2.6902E−01 | 1.3689E−01 | 1.8572E−01 |
| C: | 3.6064E−02 | −4.2957E−01 | −6.7451E−01 | −6.6676E−01 | −3.8154E−01 | −3.7008E−01 |
| D: | −5.2565E−02 | 4.7328E−01 | 8.4203E−01 | 1.0976E+00 | 5.8856E−01 | 4.4629E−01 |
| E: | 3.9894E−02 | −3.5073E−01 | −6.9309E−01 | −1.1048E+00 | −6.1094E−01 | −3.2899E−01 |
| F: | −1.4608E−02 | 1.4967E−01 | 3.2701E−01 | 6.1033E−01 | 3.5525E−01 | 1.3332E−01 |
| G: | 1.7540E−03 | −2.7908E−02 | −6.5734E−02 | −1.4007E−01 | −8.2166E−02 | −1.7988E−02 |

| surface | 8 | 9 | 10 | 11 | 12 | 13 |
|---|---|---|---|---|---|---|
| K: | −3.1030E+01 | −9.1547E+00 | −2.1427E−02 | −4.6541E+00 | −6.6520E−01 | −9.2216E+01 |
| A: | −1.9420E−01 | −1.8731E−01 | −1.3461E−02 | 3.2478E−02 | 5.5123E−02 | −1.0837E−02 |
| B: | 1.7214E−01 | 1.0009E−01 | −2.3009E−02 | −1.3690E−02 | −3.6427E−02 | −3.9768E−03 |

TABLE 6-continued

| Aspheric Coefficients | | | | | | |
|---|---|---|---|---|---|---|
| C: | −1.1898E−01 | −4.3308E−02 | 2.0346E−02 | 1.9712E−02 | 1.6275E−02 | 1.7257E−03 |
| D: | 4.1988E−02 | 1.3731E−03 | −1.4537E−02 | −1.7002E−02 | −3.5107E−03 | −3.6822E−04 |
| E: | −1.8999E−03 | 7.1015E−03 | 3.9992E−03 | 6.0042E−03 | 4.0979E−04 | 4.2613E−05 |
| F: | −2.0210E−03 | −2.2536E−03 | −4.0554E−04 | −9.5198E−04 | −2.5130E−05 | −2.4396E−06 |
| G: | 2.9834E−04 | 2.0118E−04 | 1.2019E−05 | 5.6802E−05 | 6.4335E−07 | 5.3908E−08 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 4.76 | f12/f34 | −0.37 |
| Fno | 1.84 | f34/f56 | −0.73 |
| FOV[deg.] | 82.22 | f123/f45 | 1.43 |
| f1/f2 | −0.43 | f123/f456 | −0.22 |
| f2/f3 | −0.01 | f1/f234 | −0.72 |
| f3/f4 | −62.64 | f234/f56 | −0.25 |
| f4/f5 | −4.72 | f12/f345 | 1.53 |
| f5/f6 | −1.17 | f345/f6 | −1.45 |
| f1/f23 | −0.43 | R5/R6 | 0.02 |
| f23/f4 | 0.59 | CT2/CT1 | 0.27 |
| f23/f45 | −2.24 | CT3/CT2 | 0.96 |
| f45/f6 | −1.45 | f/TL | 0.88 |
| V1 − V2 | 35.63 | V4 − V3 | 35.63 |

Figure 4A:
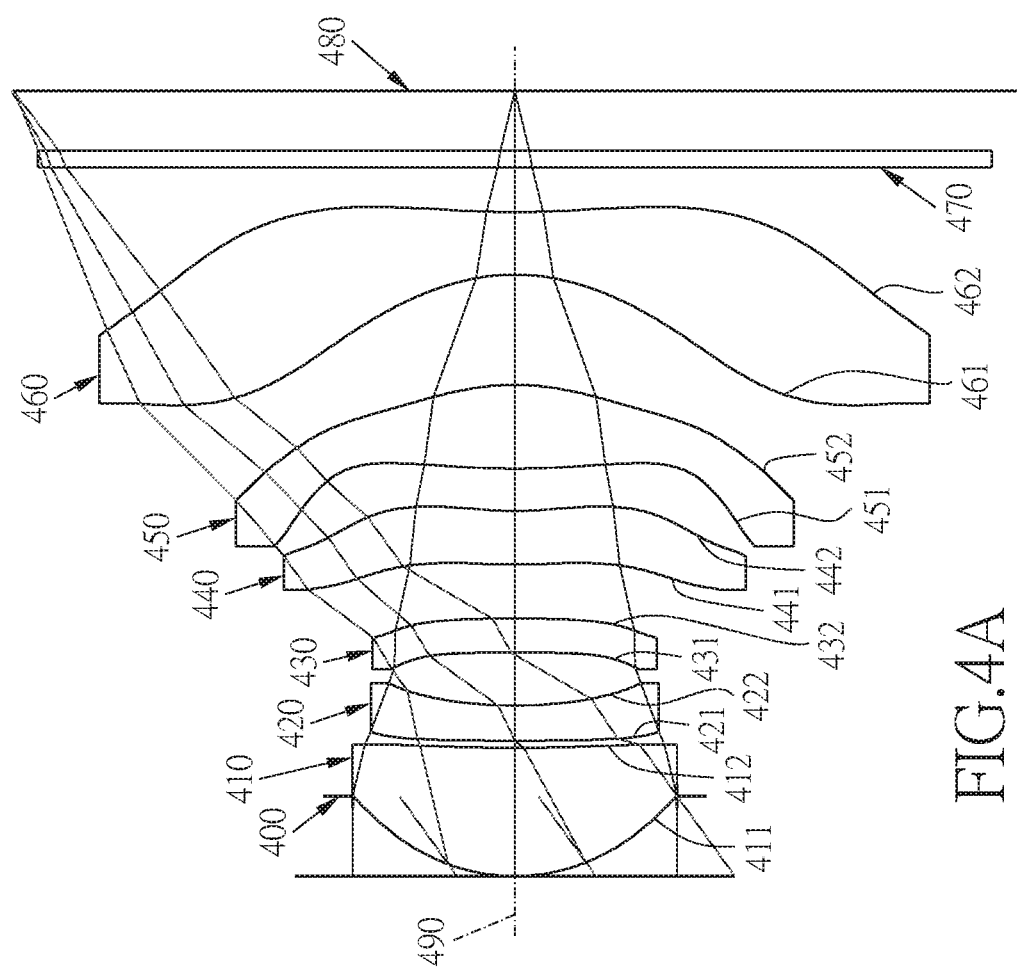
FIG. 4A shows a six-piece optical lens system in accordance with a fourth embodiment of the present invention.

Referring to FIGS. 4A and 4B, FIG. 4A shows a six-piece optical lens system in accordance with a fourth embodiment of the present invention, and FIG. 4B shows, in order from left to right, the image plane curve and the distortion curve of the fourth embodiment of the present invention. A six-piece optical lens system in accordance with the fourth embodiment of the present invention comprises a stop 400 and a lens group. The lens group comprises, in order from an object side to an image side: a first lens element 410, a second lens element 420, a third lens element 430, a fourth lens element 440, a fifth lens element 450, a sixth lens element 460, an IR cut filter 470, and an image plane 480, wherein the six-piece optical lens system has a total of six lens elements with refractive power. The stop 400 is disposed between an image-side surface 412 of the first lens element 410 and an object to be imaged.

The first lens element 410 with a positive refractive power has an object-side surface 411 being convex near an optical axis 490 and the image-side surface 412 being concave near the optical axis 490, the object-side surface 411 and the image-side surface 412 are aspheric, and the first lens element 410 is made of plastic material.

The second lens element 420 with a negative refractive power has an object-side surface 421 being convex near the optical axis 490 and the image-side surface 422 being concave near the optical axis 490, the object-side surface 421 and the image-side surface 422 are aspheric, and the second lens element 420 is made of plastic material.

The third lens element 430 with a positive refractive power has an object-side surface 431 being convex near the optical axis 490 and an image-side surface 432 being convex near the optical axis 490, the object-side surface 431 and the image-side surface 432 are aspheric, and the third lens element 430 is made of plastic material.

The fourth lens element 440 with a negative refractive power has an object-side surface 441 being convex near the optical axis 490 and an image-side surface 442 being concave near the optical axis 490, the object-side surface 441 and the image-side surface 442 are aspheric and are provided with at least one inflection point, and the fourth lens element 440 is made of plastic material.

The fifth lens element 450 with a positive refractive power has an object-side surface 451 being convex near the optical axis 490 and an image-side surface 452 being convex near the optical axis 490, the object-side surface 451 and the image-side surface 452 are aspheric, the fifth lens element 450 is made of plastic material, and the object-side surface 451 is provided with at least one inflection point.

The sixth lens element 460 with a negative refractive power has an object-side surface 461 being concave near the optical axis 490 and an image-side surface 462 being concave near the optical axis 490, the object-side surface 461 and the image-side surface 462 are aspheric, the sixth lens element 460 is made of plastic material, and the image-side surface 462 is provided with at least one inflection point.

The IR cut filter 470 made of glass is located between the sixth lens element 460 and the image plane 480 and has no influence on the focal length of the six-piece optical lens system.

The detailed optical data of the fourth embodiment is shown in table 7, and the aspheric surface data is shown in table 8.

TABLE 7

Embodiment 4
f(focal length) = 4.78 mm, Fno = 1.84, FOV = 79.46 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.549 | | | | |
| 2 | Lens 1 | 1.753 | (ASP) | 0.878 | plastic | 1.54 | 56 | 3.84 |
| 3 | | 8.813 | (ASP) | 0.049 | | | | |
| 4 | Lens 2 | 11.932 | (ASP) | 0.242 | plastic | 1.67 | 19.24 | −8.78 |
| 5 | | 3.938 | (ASP) | 0.363 | | | | |

TABLE 7-continued

Embodiment 4
f(focal length) = 4.78 mm, Fno = 1.84, FOV = 79.46 deg.

| surface | | Curvature Radius | | Thickness | Material | Index | Abbe # | Focal length |
|---|---|---|---|---|---|---|---|---|
| 6 | Lens 3 | 487.503 | (ASP) | 0.231 | plastic | 1.67 | 19.24 | 533.09 |
| 7 | | −1393.791 | (ASP) | 0.374 | | | | |
| 8 | Lens 4 | 6.198 | (ASP) | 0.367 | plastic | 1.54 | 56 | −15.10 |
| 9 | | 3.465 | (ASP) | 0.290 | | | | |
| 10 | Lens 5 | 7.858 | (ASP) | 0.574 | plastic | 1.54 | 56 | 3.22 |
| 11 | | −2.207 | (ASP) | 0.755 | | | | |
| 12 | Lens 6 | −1.870 | (ASP) | 0.429 | plastic | 1.54 | 56 | −2.74 |
| 13 | | 8.130 | (ASP) | 0.308 | | | | |
| 14 | IR-filter | infinity | | 0.110 | glass | 1.52 | 64.2 | |
| 15 | | infinity | | 0.411 | | | | |
| 16 | Image plane | infinity | | 0.000 | | | | |

TABLE 8

Aspheric Coefficients

| surface | 2 | 3 | 4 | 5 | 6 | 7 |
|---|---|---|---|---|---|---|
| K: | −7.508E−01 | 4.757E+01 | 9.761E+01 | −2.058E+01 | 5.815E+01 | 8.608E+01 |
| A: | 1.975E−02 | −1.382E−01 | −1.509E−01 | −1.441E−02 | −1.277E−01 | −1.394E−01 |
| B: | −6.584E−03 | 2.906E−01 | 3.998E−01 | 2.678E−01 | 1.112E−01 | 1.688E−01 |
| C: | 3.355E−02 | −4.689E−01 | −6.904E−01 | −6.633E−01 | −2.879E−01 | −3.262E−01 |
| D: | −4.903E−02 | 5.269E−01 | 8.591E−01 | 1.090E+00 | 3.966E−01 | 3.818E−01 |
| E: | 3.713E−02 | −3.927E−01 | −7.022E−01 | −1.094E+00 | −3.875E−01 | −2.736E−01 |
| F: | −1.345E−02 | 1.669E−01 | 3.281E−01 | 6.014E−01 | 2.187E−01 | 1.078E−01 |
| G: | 1.550E−03 | −3.077E−02 | −6.526E−02 | −1.372E−01 | −4.839E−02 | −1.316E−02 |

| surface | 8 | 9 | 10 | 11 | 12 | 13 |
|---|---|---|---|---|---|---|
| K: | −3.127E+01 | −9.074E+00 | 1.834E−01 | −4.641E+00 | −6.629E−01 | −9.222E+01 |
| A: | −1.949E−01 | −1.860E−01 | −1.229E−02 | 3.373E−02 | 5.285E−02 | −1.235E−02 |
| B: | 1.735E−01 | 9.769E−02 | −2.359E−02 | −1.555E−02 | −3.467E−02 | −2.999E−03 |
| C: | −1.233E−01 | −4.182E−02 | 1.950E−02 | 2.061E−02 | 1.560E−02 | 1.390E−03 |
| D: | 4.752E−02 | 1.426E−03 | −1.328E−02 | −1.712E−02 | −3.376E−03 | −2.984E−04 |
| E: | −5.036E−03 | 6.749E−03 | 3.371E−03 | 5.960E−03 | 3.949E−04 | 3.432E−05 |
| F: | −1.193E−03 | −2.138E−03 | −2.680E−04 | −9.361E−04 | −2.427E−05 | −1.929E−06 |
| G: | 2.143E−04 | 1.898E−04 | 7.004E−07 | 5.541E−05 | 6.227E−07 | 4.138E−08 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 4.75 | f12/f34 | −0.37 |
| Fno | 1.84 | f34/f56 | −0.73 |
| FOV[deg.] | 79.46 | f123/f45 | 1.42 |
| f1/f2 | −0.44 | f123/f456 | −0.23 |
| f2/f3 | −0.02 | f1/f234 | −0.72 |
| f3/f4 | −35.29 | f234/f56 | −0.25 |
| f4/f5 | −4.69 | f12/f345 | 1.44 |
| f5/f6 | −1.17 | f345/f6 | −1.45 |
| f1/f23 | −0.43 | R5/R6 | −0.35 |
| f23/f4 | 0.59 | CT2/CT1 | 0.28 |
| f23/f45 | −2.23 | CT3/CT2 | 0.95 |
| f45/f6 | −1.46 | f/TL | 0.88 |
| V1 − V2 | 35.63 | V4 − V3 | 35.63 |

Figure 5A:
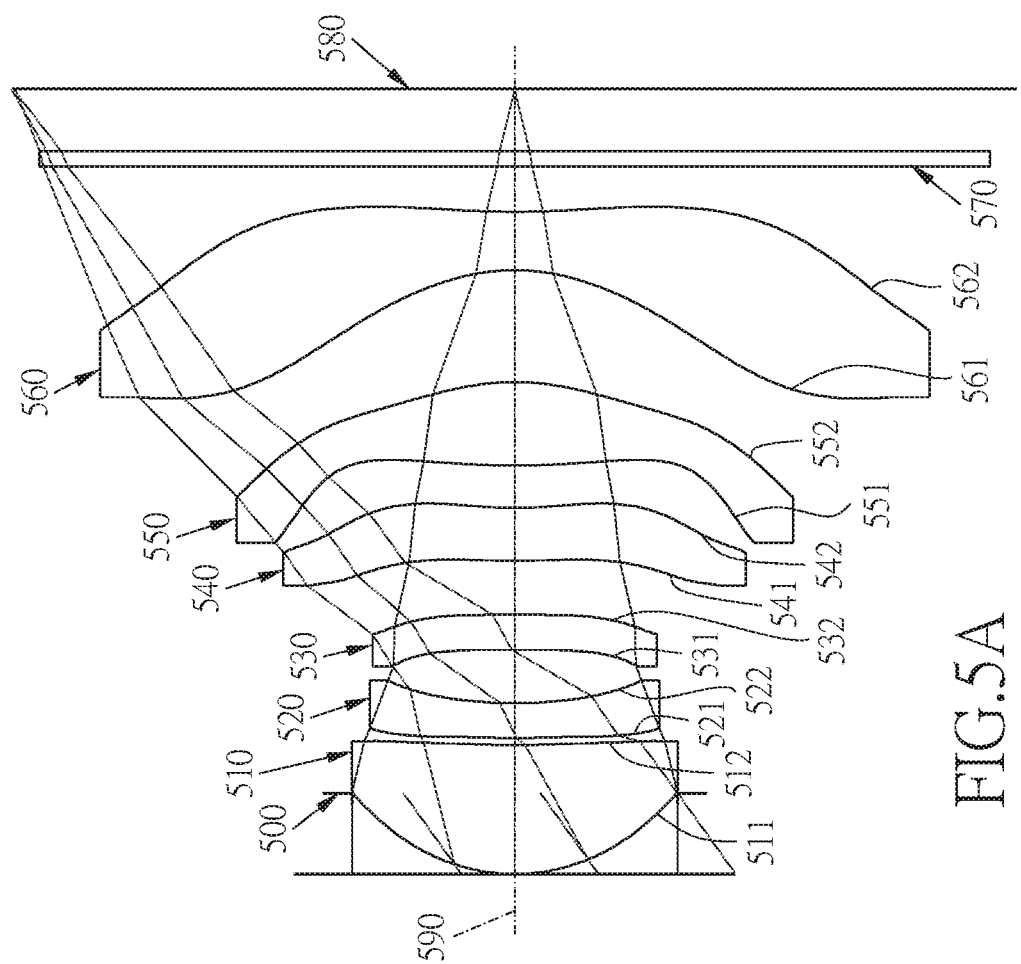
FIG. 5A shows a six-piece optical lens system in accordance with a fifth embodiment of the present invention.
Figure 5B:
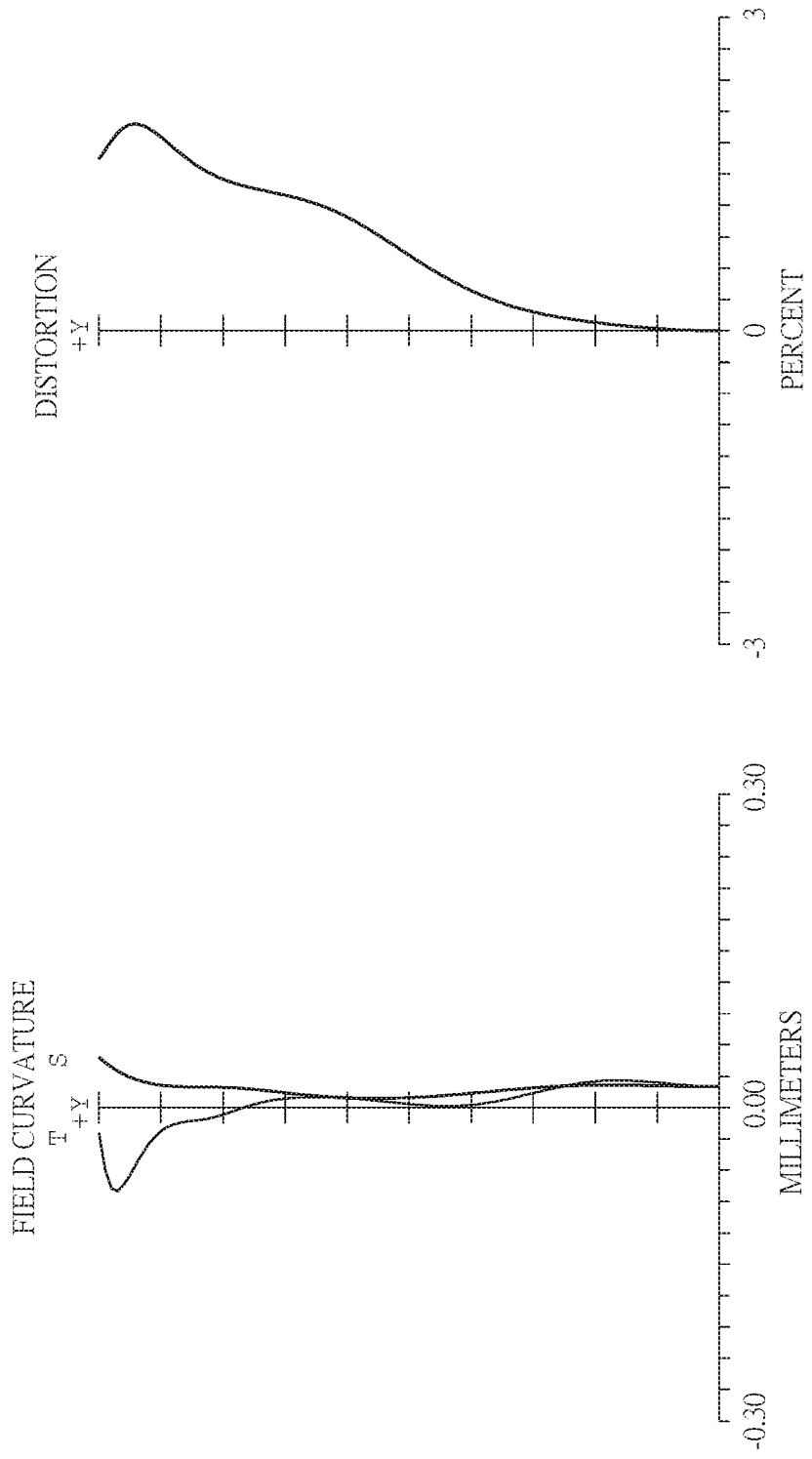
FIG. 5B shows the image plane curve and the distortion curve of the fifth embodiment of the present invention.

Referring to FIGS. 5A and 5B, FIG. 5A shows a six-piece optical lens system in accordance with a fifth embodiment of the present invention, and FIG. 5B shows, in order from left to right, the image plane curve and the distortion curve of the fifth embodiment of the present invention. A six-piece optical lens system in accordance with the fifth embodiment of the present invention comprises a stop 500 and a lens group. The lens group comprises, in order from an object side to an image side: a first lens element 510, a second lens element 520, a third lens element 530, a fourth lens element 540, a fifth lens element 550, a sixth lens element 560, an IR cut filter 570, and an image plane 580, wherein the six-piece optical lens system has a total of six lens elements with refractive power. The stop 500 is disposed between an image-side surface 512 of the first lens element 510 and an object to be imaged.

The first lens element 510 with a positive refractive power has an object-side surface 511 being convex near an optical axis 590 and the image-side surface 512 being concave near the optical axis 590, the object-side surface 511 and the image-side surface 512 are aspheric, and the first lens element 510 is made of plastic material.

The second lens element 520 with a negative refractive power has an object-side surface 521 being convex near the optical axis 590 and the image-side surface 522 being concave near the optical axis 590, the object-side surface 521 and the image-side surface 522 are aspheric, and the second lens element 520 is made of plastic material.

The third lens element 530 with a positive refractive power has an object-side surface 531 being concave near the optical axis 590 and an image-side surface 532 being convex near the optical axis 590, the object-side surface 531 and the image-side surface 532 are aspheric, and the third lens element 530 is made of plastic material.

The fourth lens element 540 with a negative refractive power has an object-side surface 541 being convex near the optical axis 590 and an image-side surface 542 being concave near the optical axis 590, the object-side surface 541 and the image-side surface 542 are aspheric and are provided with at least one inflection point, and the fourth lens element 540 is made of plastic material.

The fifth lens element 550 with a positive refractive power has an object-side surface 551 being convex near the optical axis 590 and an image-side surface 552 being convex near the optical axis 590, the object-side surface 551 and the image-side surface 552 are aspheric, the fifth lens element 550 is made of plastic material, and the object-side surface 551 is provided with at least one inflection point.

The sixth lens element 560 with a negative refractive power has an object-side surface 561 being concave near the optical axis 590 and an image-side surface 562 being concave near the optical axis 590, the object-side surface 561 and the image-side surface 562 are aspheric, the sixth lens element 560 is made of plastic material, and the image-side surface 562 is provided with at least one inflection point.

The IR cut filter 570 made of glass is located between the sixth lens element 560 and the image plane 580 and has no influence on the focal length of the six-piece optical lens system.

The detailed optical data of the fifth embodiment is shown in table 9, and the aspheric surface data is shown in table 10.

TABLE 9

Embodiment 5
f(focal length) = 4.77 mm, Fno = 1.84, FOV = 82.25 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.553 | | | | |
| 2 | Lens 1 | 1.753 | (ASP) | 0.885 | plastic | 1.54 | 56 | 3.84 |
| 3 | | 8.804 | (ASP) | 0.049 | | | | |
| 4 | Lens 2 | 11.924 | (ASP) | 0.237 | plastic | 1.67 | 19.24 | −8.74 |
| 5 | | 3.925 | (ASP) | 0.365 | | | | |
| 6 | Lens 3 | −305.149 | (ASP) | 0.242 | plastic | 1.67 | 19.24 | 415.49 |
| 7 | | −146.475 | (ASP) | 0.368 | | | | |
| 8 | Lens 4 | 6.272 | (ASP) | 0.363 | plastic | 1.54 | 56 | −14.72 |
| 9 | | 3.451 | (ASP) | 0.292 | | | | |
| 10 | Lens 5 | 7.840 | (ASP) | 0.571 | plastic | 1.54 | 56 | 3.22 |
| 11 | | −2.206 | (ASP) | 0.767 | | | | |
| 12 | Lens 6 | −1.886 | (ASP) | 0.400 | plastic | 1.54 | 56 | −2.72 |
| 13 | | 7.542 | (ASP) | 0.308 | | | | |
| 14 | IR-filter | infinity | | 0.110 | glass | 1.52 | 64.2 | |
| 15 | | infinity | | 0.424 | | | | |
| 16 | Image plane | infinity | | 0.000 | | | | |

TABLE 10

Aspheric Coefficients

| surface | 2 | 3 | 4 | 5 | 6 | 7 |
|---|---|---|---|---|---|---|
| K: | −7.5154E−01 | 4.7474E+01 | 9.7527E+01 | −2.0651E+01 | 5.8150E+01 | 8.6080E+01 |
| A: | 1.8797E−02 | −1.4069E−01 | −1.5696E−01 | −1.7659E−02 | −1.2828E−01 | −1.4116E−01 |
| B: | −2.4137E−03 | 3.0019E−01 | 4.2609E−01 | 2.8536E−01 | 1.3778E−01 | 1.9184E−01 |
| C: | 2.3435E−02 | −4.9410E−01 | −7.5240E−01 | −7.1209E−01 | −4.2443E−01 | −4.1122E−01 |
| D: | −3.5237E−02 | 5.7020E−01 | 9.5218E−01 | 1.1764E+00 | 7.2366E−01 | 5.4034E−01 |
| E: | 2.6429E−02 | −4.3367E−01 | −7.8429E−01 | −1.1881E+00 | −8.0448E−01 | −4.3689E−01 |
| F: | −9.0451E−03 | 1.8633E−01 | 3.6675E−01 | 6.5829E−01 | 4.8829E−01 | 1.9512E−01 |
| G: | 8.1844E−04 | −3.4442E−02 | −7.2805E−02 | −1.5144E−01 | −1.1727E−01 | −3.2040E−02 |

| surface | 8 | 9 | 10 | 11 | 12 | 13 |
|---|---|---|---|---|---|---|
| K: | −3.0881E+01 | −8.8588E+00 | −3.1743E−01 | −4.6974E+00 | −6.6167E−01 | −9.2216E+01 |
| A: | −1.9294E−01 | −1.8496E−01 | −1.4349E−02 | 3.0476E−02 | 4.3174E−02 | −1.8642E−02 |
| B: | 1.6049E−01 | 9.1970E−02 | −1.8839E−02 | −9.7082E−03 | −2.0758E−02 | 1.9625E−03 |
| C: | −9.5454E−02 | −3.2869E−02 | 1.2083E−02 | 1.6091E−02 | 9.2553E−03 | −1.7856E−04 |
| D: | 1.9503E−02 | −3.8301E−03 | −6.8625E−03 | −1.4807E−02 | −1.9821E−03 | −2.7665E−05 |
| E: | 9.3156E−03 | 8.0034E−03 | 5.0504E−04 | 5.2286E−03 | 2.3059E−04 | 7.4236E−06 |
| F: | −4.7902E−03 | −2.2142E−03 | 3.5576E−04 | −8.1746E−04 | −1.4180E−05 | −4.8628E−07 |
| G: | 5.6506E−04 | 1.8229E−04 | −5.1772E−05 | 4.7966E−05 | 3.6756E−07 | 9.0375E−09 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 4.77 | f12/f34 | −0.38 |
| Fno | 1.84 | f34/f56 | −0.71 |
| FOV[deg.] | 82.25 | f123/f45 | 1.41 |
| f1/f2 | −0.44 | f123/f456 | −0.25 |
| f2/f3 | −0.02 | f1/f234 | −0.73 |
| f3/f4 | −28.24 | f234/f56 | −0.24 |
| f4/f5 | −4.58 | f12/f345 | 1.44 |
| f5/f6 | −1.18 | f345/f6 | −1.47 |
| f1/f23 | −0.43 | R5/R6 | 2.08 |
| f23/f4 | 0.61 | CT2/CT1 | 0.27 |
| f23/f45 | −2.23 | CT3/CT2 | 1.02 |
| f45/f6 | −1.48 | f/TL | 0.89 |
| V1 − V2 | 35.63 | V4 − V3 | 35.63 |

Figure 6A:
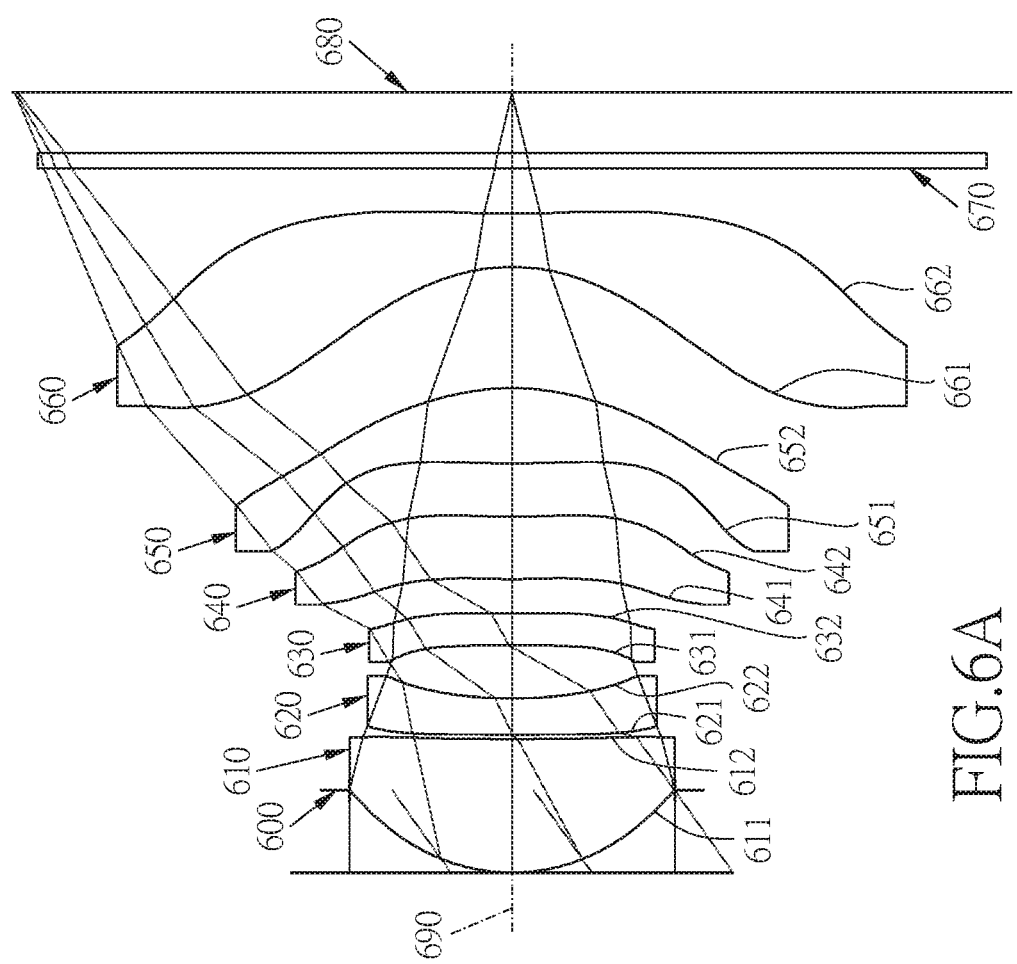
FIG. 6A shows a six-piece optical lens system in accordance with a sixth embodiment of the present invention.
Figure 6B:
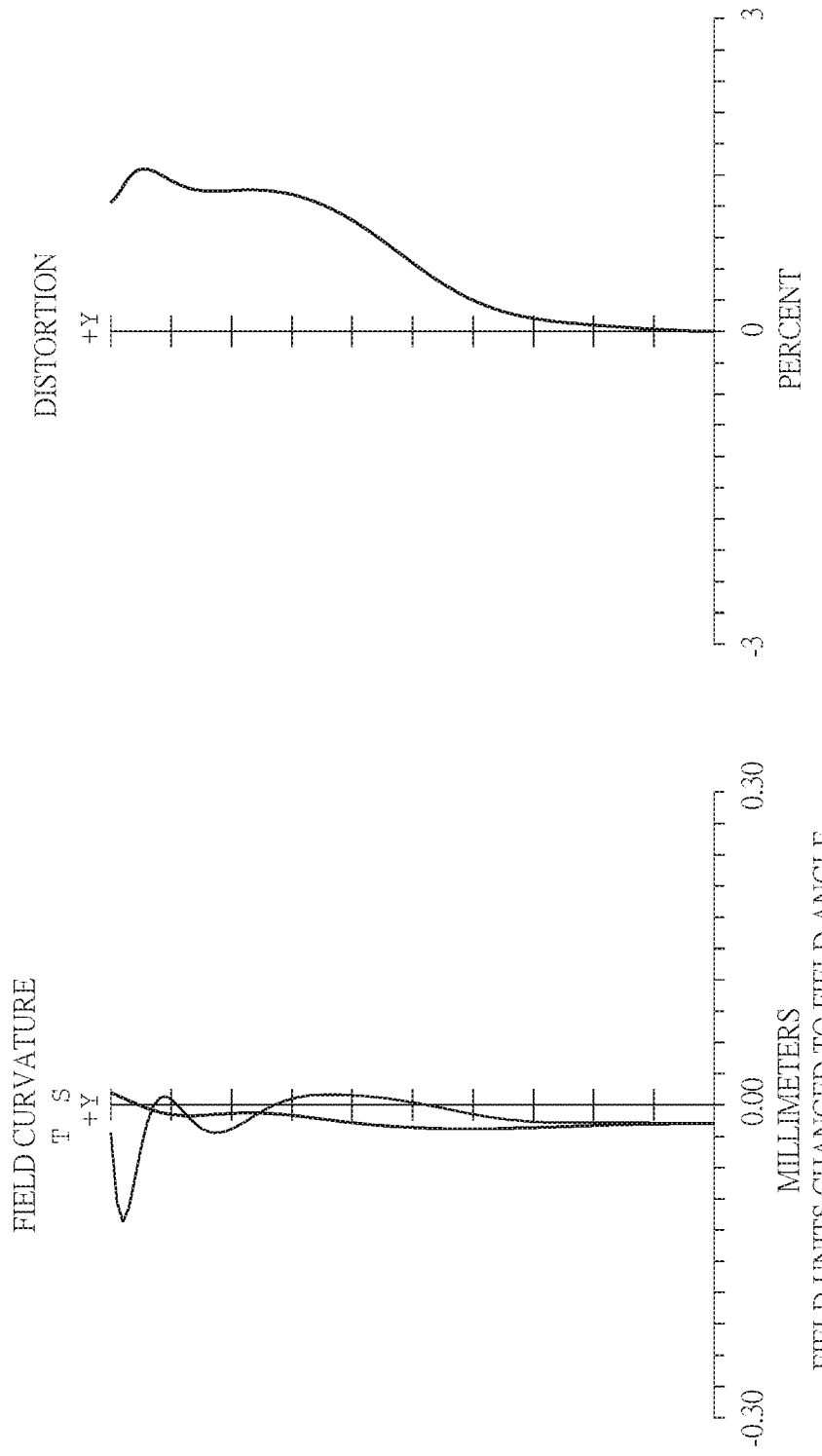
FIG. 6B shows the image plane curve and the distortion curve of the sixth embodiment of the present invention.

Referring to FIGS. 6A and 6B, FIG. 6A shows a six-piece optical lens system in accordance with a sixth embodiment of the present invention, and FIG. 6B shows, in order from left to right, the image plane curve and the distortion curve of the sixth embodiment of the present invention. A six-piece optical lens system in accordance with the sixth embodiment of the present invention comprises a stop 600 and a lens group. The lens group comprises, in order from an object side to an image side: a first lens element 610, a second lens element 620, a third lens element 630, a fourth lens element 640, a fifth lens element 650, a sixth lens element 660, an IR cut filter 670, and an image plane 680, wherein the six-piece optical lens system has a total of six lens elements with refractive power. The stop 600 is disposed between an image-side surface 612 of the first lens element 610 and an object to be imaged.

The first lens element 610 with a positive refractive power has an object-side surface 611 being convex near an optical axis 690 and the image-side surface 612 being concave near the optical axis 690, the object-side surface 611 and the image-side surface 612 are aspheric, and the first lens element 610 is made of plastic material.

The second lens element 620 with a negative refractive power has an object-side surface 621 being convex near the optical axis 690 and the image-side surface 622 being concave near the optical axis 690, the object-side surface 621 and the image-side surface 622 are aspheric, and the second lens element 620 is made of plastic material.

The third lens element 630 with a negative refractive power has an object-side surface 631 being convex near the optical axis 690 and an image-side surface 632 being concave near the optical axis 690, the object-side surface 631 and the image-side surface 632 are aspheric, and the third lens element 630 is made of plastic material.

The fourth lens element 640 with a negative refractive power has an object-side surface 641 being convex near the optical axis 690 and an image-side surface 642 being concave near the optical axis 690, the object-side surface 641 and the image-side surface 642 are aspheric and are provided with at least one inflection point, and the fourth lens element 640 is made of plastic material.

The fifth lens element 650 with a positive refractive power has an object-side surface 651 being convex near the optical axis 690 and an image-side surface 652 being convex near the optical axis 690, the object-side surface 651 and the image-side surface 652 are aspheric, the fifth lens element 650 is made of plastic material, and the object-side surface 651 is provided with at least one inflection point.

The sixth lens element 660 with a negative refractive power has an object-side surface 661 being concave near the optical axis 690 and an image-side surface 662 being concave near the optical axis 690, the object-side surface 661 and the image-side surface 662 are aspheric, the sixth lens element 660 is made of plastic material, and the image-side surface 662 is provided with at least one inflection point.

The IR cut filter 670 made of glass is located between the sixth lens element 660 and the image plane 680 and has no influence on the focal length of the six-piece optical lens system.

The detailed optical data of the sixth embodiment is shown in table 11, and the aspheric surface data is shown in table 12.

TABLE 11

Embodiment 6
f(focal length) = 4.73 mm, Fno = 1.80, FOV = 82.06 deg.

| surface | | Curvature Radius | | Thickness | Material | Index | Abbe # | Focal length |
|---|---|---|---|---|---|---|---|---|
| 0 | object | infinity | | infinity | | | | |
| 1 | stop | infinity | | −0.569 | | | | |
| 2 | Lens 1 | 1.758 | (ASP) | 0.920 | plastic | 1.54 | 56 | 3.78 |
| 3 | | 9.670 | (ASP) | 0.030 | | | | |
| 4 | Lens 2 | 12.187 | (ASP) | 0.252 | plastic | 1.66 | 20.37 | −8.90 |
| 5 | | 3.958 | (ASP) | 0.366 | | | | |
| 6 | Lens 3 | 101.061 | (ASP) | 0.223 | plastic | 1.66 | 20.37 | −56.10 |
| 7 | | 27.286 | (ASP) | 0.236 | | | | |
| 8 | Lens 4 | 9.910 | (ASP) | 0.430 | plastic | 1.54 | 56 | −38.27 |
| 9 | | 6.620 | (ASP) | 0.369 | | | | |
| 10 | Lens 5 | 13.140 | (ASP) | 0.518 | plastic | 1.54 | 56 | 3.65 |
| 11 | | −2.320 | (ASP) | 0.837 | | | | |
| 12 | Lens 6 | −1.805 | (ASP) | 0.369 | plastic | 1.54 | 56 | −2.83 |
| 13 | | 11.642 | (ASP) | 0.308 | | | | |
| 14 | IR-filter | infinity | | 0.110 | glass | 1.52 | 64.2 | |
| 15 | | infinity | | 0.416 | | | | |
| 16 | Image plane | infinity | | 0.000 | | | | |

TABLE 12

Aspheric Coefficients

| surface | 2 | 3 | 4 | 5 | 6 | 7 |
|---|---|---|---|---|---|---|
| K: | −7.5816E−01 | 4.8601E+01 | 9.8781E+01 | −1.9635E+01 | 5.8150E+01 | 8.6080E+01 |
| A: | 1.4747E−02 | −1.6029E−01 | −1.6982E−01 | 7.9038E−03 | −1.5000E−01 | −1.8363E−01 |
| B: | 1.3843E−02 | 2.3113E−01 | 3.4928E−01 | 1.2676E−01 | 2.7703E−01 | 3.2124E−01 |
| C: | −1.4776E−02 | −2.9248E−02 | −2.9868E−01 | −1.6303E−01 | −8.3732E−01 | −6.5848E−01 |
| D: | 1.4633E−02 | −3.1956E−01 | 5.6396E−02 | 8.4158E−02 | 1.4937E+00 | 8.8239E−01 |
| E: | −9.8926E−03 | 3.9259E−01 | 8.3453E−02 | 2.3490E−02 | −1.6709E+00 | −7.5941E−01 |
| F: | 4.8288E−03 | −1.9581E−01 | −5.3670E−02 | −4.5616E−02 | 1.0171E+00 | 3.7346E−01 |
| G: | −1.3112E−03 | 3.6508E−02 | 8.9019E−03 | 1.6064E−02 | −2.5038E−01 | −7.3753E−02 |

| surface | 8 | 9 | 10 | 11 | 12 | 13 |
|---|---|---|---|---|---|---|
| K: | −3.2119E+01 | −9.7956E+00 | 1.4299E+01 | −2.5794E+00 | −6.6588E−01 | −9.2216E+01 |
| A: | −1.9109E−01 | −1.6379E−01 | −3.6053E−02 | 2.1573E−02 | 1.7486E−02 | −3.7220E−02 |
| B: | 1.2809E−01 | 4.7665E−02 | −3.3860E−02 | −2.2589E−02 | −2.6498E−03 | 1.4563E−02 |
| C: | 1.8370E−03 | 1.7769E−02 | 1.5855E−02 | 4.2143E−03 | 3.5924E−03 | −4.5938E−03 |
| D: | −1.1913E−01 | −3.6343E−02 | −1.8183E−03 | 1.9148E−03 | −1.0074E−03 | 8.9000E−04 |
| E: | 1.0679E−01 | 1.7891E−02 | −2.6521E−03 | −8.3801E−04 | 1.3965E−04 | −1.0658E−04 |
| F: | −3.6728E−02 | −3.1912E−03 | 1.2276E−03 | 1.1365E−04 | −1.0067E−05 | 7.1553E−06 |
| G: | 4.4574E−03 | 1.4244E−04 | −1.4528E−04 | −5.3819E−06 | 3.0889E−07 | −2.0010E−07 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 4.73 | f12/f34 | −0.25 |
| Fno | 1.80 | f34/f56 | −0.22 |
| FOV[deg.] | 82.06 | f123/f45 | 1.47 |
| f1/f2 | −0.42 | f123/f456 | −0.15 |
| f2/f3 | 0.16 | f1/f234 | −0.61 |
| f3/f4 | 1.47 | f234/f56 | −0.24 |
| f4/f5 | −10.48 | f12/f345 | 1.44 |
| f5/f6 | −1.29 | f345/f6 | −1.50 |
| f1/f23 | −0.50 | R5/R6 | 3.70 |
| f23/f4 | 0.20 | CT2/CT1 | 0.27 |
| f23/f45 | −1.89 | CT3/CT2 | 0.88 |
| f45/f6 | −1.42 | f/TL | 0.88 |
| V1 − V2 | 35.63 | V4 − V3 | 35.63 |

In the present six-piece optical lens system, the lens elements can be made of plastic or glass. If the lens elements are made of plastic, the cost will be effectively reduced. If the lens elements are made of glass, there is more freedom in distributing the refractive power of the six-piece optical lens system. Plastic lens elements can have aspheric surfaces, which allow more design parameter freedom (than spherical surfaces), so as to reduce the aberration and the number of the lens elements, as well as the total track length of the six-piece optical lens system.

In the present six-piece optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The six-piece optical lens system of the present invention can be used in focusing optical systems and can obtain better image quality. The six-piece optical lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A six-piece optical lens system comprising a stop and a lens group having six lens elements, in order from an object side to an image side, comprising:
   the stop;
   a first lens element with a positive refractive power, having an object-side surface being convex near an optical axis and an image-side surface being concave near the optical axis, at least one of the object-side surface and the image-side surface of the first lens element being aspheric;
   a second lens element with a negative refractive power, having an object-side surface being convex near the optical axis and an image-side surface being concave near the optical axis, at least one of the object-side surface and the image-side surface of the second lens element being aspheric;
   a third lens element with a refractive power, at least one of an object-side surface and an image-side surface of the third lens element being aspheric;
   a fourth lens element with a negative refractive power, having an object-side surface being convex near the optical axis and an image-side surface being concave near the optical axis, at least one of the object-side surface and the image-side surface of the fourth lens element being aspheric and provided with at least one inflection point;
   a fifth lens element with a positive refractive power, having an object-side surface being convex near the optical axis and an image-side surface being convex near the optical axis, at least one of the object-side surface and the image-side surface of the fifth lens element being aspheric and provided with at least one inflection point; and a sixth lens element with a negative refractive power, having an object-side surface being concave near the optical axis and an image-side surface being concave near the optical axis, at least one of the object-side surface and the image-side surface of the sixth lens element being aspheric and provided with at least one inflection point;

wherein a focal length of the third lens element is f3, a focal length of the fourth lens element is f4, and they satisfy the relation: −81<f3/f4≤−28.24.

2. The six-piece optical lens system as claimed in claim 1, wherein a focal length of the first lens element is f1, a focal length of the second lens element is f2, and they satisfy the relation: −0.6<f1/f2<−0.3.

3. The six-piece optical lens system as claimed in claim 1, wherein a focal length of the second lens element is f2, the focal length of the third lens element is f3, and they satisfy the relation: −0.03<f2/f3<0.43.

4. The six-piece optical lens system as claimed in claim 1, wherein the focal length of the fourth lens element is f4, a focal length of the fifth lens element is f5, and they satisfy the relation: −13.6<f4/f5<−3.3.

5. The six-piece optical lens system as claimed in claim 1, wherein a focal length of the fifth lens element is f5, a focal length of the sixth lens element is f6, and they satisfy the relation: −1.7<f5/f6<−0.75.

6. The six-piece optical lens system as claimed in claim 1, wherein a focal length of the first lens element is f1, a focal length of the second lens element and the third lens element combined is f23, and they satisfy the relation: −0.70<f1/f23<−0.30.

7. The six-piece optical lens system as claimed in claim 1, wherein a focal length of the second lens element and the third lens element combined is f23, the focal length of the fourth lens element is f4, and they satisfy the relation: 0.1<f23/f4<0.85.

8. The six-piece optical lens system as claimed in claim 1, wherein a focal length of the second lens element and the third lens element combined is f23, a focal length of the fourth lens element and the fifth lens element combined is f45, and they satisfy the relation: −3.0<f23/f45<−1.0.

9. The six-piece optical lens system as claimed in claim 1, wherein a focal length of the fourth lens element and the fifth lens element combined is f45, a focal length of the sixth lens element is f6, and they satisfy the relation: −1.9<f45/f6<−0.85.

10. The six-piece optical lens system as claimed in claim 1, wherein a focal length of the first lens element and the second lens element combined is f12, a focal length of the third lens element and the fourth lens element combined is f34, and they satisfy the relation: −0.65<f12/f34<−0.15.

11. The six-piece optical lens system as claimed in claim 1, wherein a focal length of the third lens element and the fourth lens element combined is f34, a focal length of the fifth lens element and the sixth lens element combined is f56, and they satisfy the relation: −1.25<f34/f56 21 −0.15.

12. The six-piece optical lens system as claimed in claim 1, wherein a focal length of the first lens element, the second lens element and the third lens element combined is f123, a focal length of the fourth lens element and the fifth lens element combined is f45, and they satisfy the relation: 1.0<f123/f45<2.5.

13. The six-piece optical lens system as claimed in claim 1, wherein a focal length of the first lens element, the second lens element and the third lens element combined is f123, a focal length of the fourth lens element, the fifth lens element and the sixth lens element combined is f456, and they satisfy the relation: −0.35<f123/f456<0.15.

14. The six-piece optical lens system as claimed in claim 1, wherein a focal length of the first lens element is f1, a focal length of the second lens element, the third lens element and the fourth lens element combined is f234, and they satisfy the relation: −1.05<f1/f234<−0.45.

15. The six-piece optical lens system as claimed in claim 1, wherein a focal length of the second lens element, the third lens element and the fourth lens element combined is f234, a focal length of the fifth lens element and the sixth lens element combined is f56, and they satisfy the relation: −0.55<f234/f56<−0.15.

16. The six-piece optical lens system as claimed in claim 1, wherein a focal length of the first lens element and the second lens element combined is f12, a focal length of the third lens element, the fourth lens element and the fifth lens element combined is f345, and they satisfy the relation: 1.00<f12/f345<2.15.

17. The six-piece optical lens system as claimed in claim 1, wherein a focal length of the third lens element, the fourth lens element and the fifth lens element combined is f345, a focal length of the sixth lens element is f6, and they satisfy the relation: −1.95<f345/f6<−0.9.

18. The six-piece optical lens system as claimed in claim 1, wherein a radius of curvature of the object-side surface of the third lens element is R5, a radius of curvature of the image-side surface of the third lens element is R6, and they satisfy the relation: −2.0<R5/R6<4.8.

19. The six-piece optical lens system as claimed in claim 1, wherein a central thickness of the second lens element along the optical axis is CT2, a central thickness of the first lens element along the optical axis is CT1, and they satisfy the relation: 0.15<CT2/CT1<0.45.

20. The six-piece optical lens system as claimed in claim 1, wherein a central thickness of the third lens element along the optical axis is CT3, the central thickness of the second lens element along the optical axis is CT2, and they satisfy the relation: 0.60<CT3/CT2<1.35.

21. The six-piece optical lens system as claimed in claim 1, wherein a focal length of the six-piece optical lens system is f, a distance from the object-side surface of the first lens element to an image plane along the optical axis is TL, and they satisfy the relation: 0.6<f/TL<1.2.

22. The six-piece optical lens system as claimed in claim 1, wherein an Abbe number of the first lens element is V1, an Abbe number of the second lens element is V2, and they satisfy the relation: 30<V1−V2<42.

23. The six-piece optical lens system as claimed in claim 1, wherein an Abbe number of the third lens element is V3, an Abbe number of the fourth lens element is V4, and they satisfy the relation: 30<V4−V3<42.

* * * * *